US012600124B2

(12) United States Patent
Kasai

(10) Patent No.: US 12,600,124 B2
(45) Date of Patent: Apr. 14, 2026

(54) PRINT HEAD AND LIQUID EJECTION APPARATUS

(71) Applicant: SEIKO EPSON CORPORATION, Tokyo (JP)

(72) Inventor: Shunsuke Kasai, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 18/419,619

(22) Filed: Jan. 23, 2024

(65) Prior Publication Data

US 2024/0253347 A1 Aug. 1, 2024

(30) Foreign Application Priority Data

Jan. 25, 2023 (JP) ................................ 2023-009249

(51) Int. Cl.
*B41J 2/045* (2006.01)
*B41J 2/14* (2006.01)

(52) U.S. Cl.
CPC ....... *B41J 2/04563* (2013.01); *B41J 2/04508* (2013.01); *B41J 2/0454* (2013.01); *B41J 2/04541* (2013.01); *B41J 2/04573* (2013.01); *B41J 2/04581* (2013.01); *B41J 2/04588* (2013.01); *B41J 2/14233* (2013.01)

(58) Field of Classification Search
CPC ...................................................... B41J 2/0454
See application file for complete search history.

(56) References Cited

U.S. PATENT DOCUMENTS

2013/0016152 A1* 1/2013 Nonoyama .......... B41J 2/14233 347/17
2013/0215172 A1* 8/2013 Kaneko ................ B41J 2/04588 347/10
2013/0257944 A1* 10/2013 Yasutani .............. B41J 2/04568 347/10
2015/0097885 A1* 4/2015 Hosokawa ........... B41J 2/04581 347/10
2015/0266295 A1* 9/2015 Miyazaki ............... B41J 2/1646 347/71
2018/0264807 A1* 9/2018 Ito ............................ B41J 2/161
2021/0094286 A1* 4/2021 Kanno ................. B41J 2/14153
2022/0258472 A1 8/2022 Hirai et al.

FOREIGN PATENT DOCUMENTS

JP 2017033348 A * 2/2017
JP 2022-124599 A 8/2022
WO WO-2018105080 A1 * 6/2018 ............... F24H 4/04

* cited by examiner

*Primary Examiner* — Shelby L Fidler
(74) *Attorney, Agent, or Firm* — Spencer Fane LLP

(57) ABSTRACT

A print head includes an ejection module that ejects a liquid by receiving a corrected drive signal, wherein the ejection module includes a piezoelectric element including a piezoelectric body, the piezoelectric body being located between a first electrode and a second electrode, a pressure chamber substrate located on one side of the vibration plate in the stacked direction and provided with a pressure chamber whose volume changes due to deformation of the vibration plate, a nozzle that ejects a liquid according to a change in volume of the pressure chamber, and a temperature detection unit that is located on the other side of the vibration plate, wherein the drive signal is corrected based on N pieces of temperature information, where N is a natural number of 2 or more, corresponding to the temperature of the pressure chamber detected by the temperature detection unit at different timings.

6 Claims, 13 Drawing Sheets

| | | LD | MD | SD | ND |
|---|---|---|---|---|---|
| [SIH, SIL] | | [1, 1] | [1, 0] | [0, 1] | [0, 0] |
| S | td1 | H | H | L | L |
| | td2 | H | L | H | L |
| | td3 | L | L | L | H |

PRINT HEAD AND LIQUID EJECTION APPARATUS

The present application is based on, and claims priority from JP Application Serial Number 2023-009249, filed Jan. 25, 2023, the disclosure of which is hereby incorporated by reference herein in its entirety.

BACKGROUND

1. Technical Field

The present disclosure relates to a print head and a liquid ejection apparatus.

2. Related Art

The liquid ejection apparatus is known to include a print head having a piezoelectric element, a pressure chamber, and a nozzle communicating with the pressure chamber. Then, the print head ejects from the nozzle the liquid supplied to the pressure chamber by changing the volume of the pressure chamber by driving the piezoelectric element. In the liquid ejection apparatus including such a print head, there is a known technique for implementing ejection control suitable for the temperature of the ink by drive controlling a piezoelectric element based on the temperature of the ink stored in the print head.

For example, JP-A-2022-124599 discloses a technique in which a temperature detection unit that detects the temperature of the pressure chamber in which the ink is stored is provided inside a print head that includes a piezoelectric element, a pressure chamber, and a nozzle, so that it is possible to reduce the difference in temperature between a temperature detected by the temperature detection unit and a temperature inside the pressure chamber and improve the detection accuracy of the temperature of the ink stored in the pressure chamber.

However, the configuration in which a temperature detection unit is provided inside the print head, such as the liquid ejection apparatus described in JP-A-2022-124599, is not sufficient from the viewpoint of improving the ejection accuracy of the ejected ink, and there is room for improvement.

SUMMARY

According to an aspect of the present disclosure, a print head includes an ejection module that ejects a liquid by receiving a corrected drive signal, wherein the ejection module includes a piezoelectric element including a first electrode, a second electrode, and a piezoelectric body, the piezoelectric body being located between the first electrode and the second electrode in a stacked direction in which the first electrode, the second electrode, and the piezoelectric body are stacked, the piezoelectric element being driven by receiving the drive signal, a vibration plate located on one side of the piezoelectric element in the stacked direction and deformed by driving the piezoelectric element, a pressure chamber substrate located on one side of the vibration plate in the stacked direction and provided with a pressure chamber whose volume changes due to deformation of the vibration plate, a nozzle that ejects a liquid according to a change in volume of the pressure chamber, and a temperature detection unit that is located on the other side of the vibration plate in the stacked direction and detects a temperature of the pressure chamber, wherein the drive signal is corrected based on N pieces of temperature information, where N is a natural number of 2 or more, corresponding to the temperature of the pressure chamber detected by the temperature detection unit at different timings.

According to another aspect of the present disclosure, a liquid ejection apparatus includes a drive signal output circuit that outputs a corrected drive signal, a correction unit that corrects the drive signal, and a print head that receives the drive signal and ejects a liquid, wherein the print head includes an ejection module that receives the drive signal and ejects a liquid, wherein the ejection module includes a piezoelectric element including a first electrode, a second electrode, and a piezoelectric body, the piezoelectric body being located between the first electrode and the second electrode in a stacked direction in which the first electrode, the second electrode, and the piezoelectric body are stacked, the piezoelectric element being driven by receiving the drive signal, a vibration plate located on one side of the piezoelectric element in the stacked direction and deformed by driving the piezoelectric element, a pressure chamber substrate located on one side of the vibration plate in the stacked direction and provided with a pressure chamber whose volume changes due to deformation of the vibration plate, a nozzle that ejects a liquid according to a change in volume of the pressure chamber, and a temperature detection unit that is located on the other side of the vibration plate in the stacked direction and detects a temperature of the pressure chamber, and wherein the correction unit corrects the drive signal based on N pieces of temperature information, where N is a natural number of 2 or more, corresponding to the temperature of the pressure chamber detected by the temperature detection unit at different timings.

DESCRIPTION OF EMBODIMENTS

Hereinafter, preferred embodiments of the present disclosure will be described using the drawings. The drawings used are for convenience of explanation. The embodiments described below do not unduly limit the details of the present disclosure described in the claims. In addition, all of the configurations described below are not necessarily essential components of the disclosure.

1. Structure of Liquid Ejection Apparatus

Figure 1:
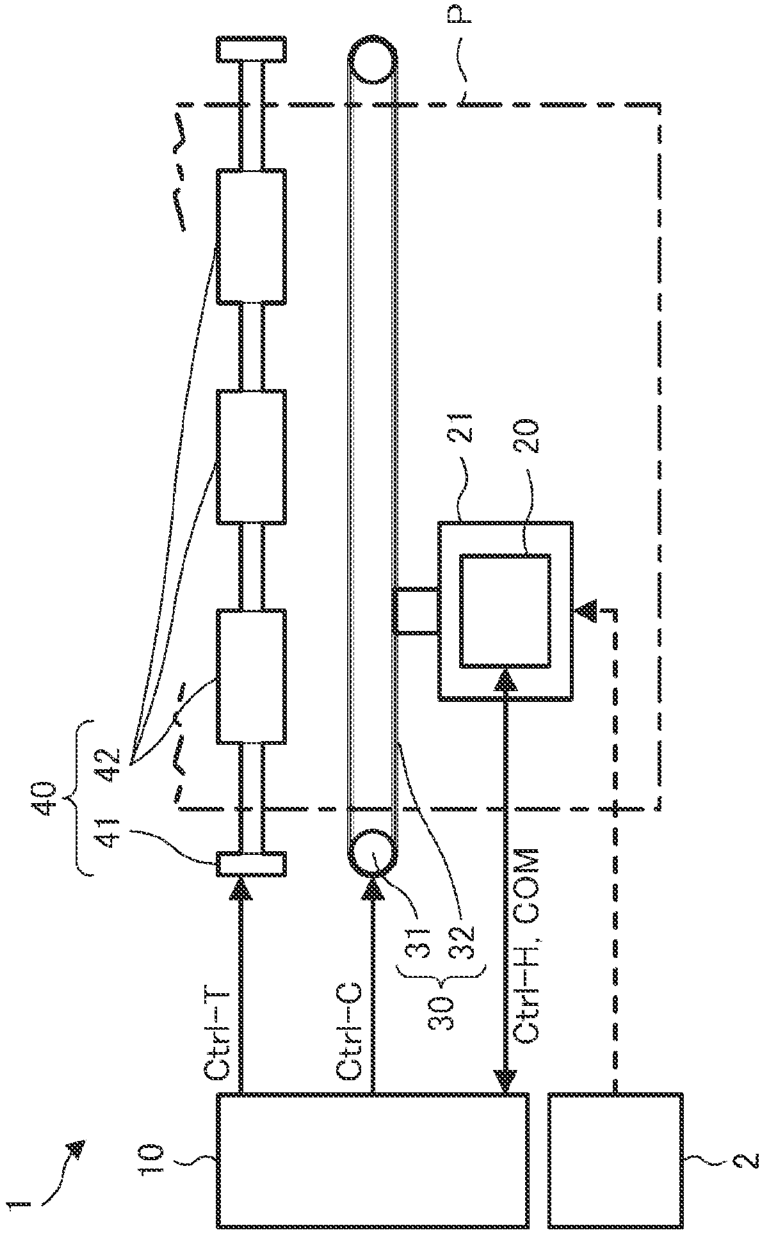
FIG. 1 is a diagram showing a schematic configuration of a liquid ejection apparatus.

FIG. 1 is a diagram showing a schematic configuration of a liquid ejection apparatus 1. In the liquid ejection apparatus 1 according to the present embodiment, the description will be made by exemplifying a serial printing type ink jet printer in which a carriage 21 on which a print head 20 that ejects the ink as an example of a liquid is mounted reciprocates along a scanning axis, and an image is formed on a medium P by ejecting the ink to the medium P that is transported along a transport direction. Examples of the medium P used in such a liquid ejection apparatus 1 can include any printing target such as printing paper, resin film, and fabric cloth.

As shown in FIG. 1, the liquid ejection apparatus 1 includes an ink container 2, a control mechanism 10, the carriage 21, a movement mechanism 30, and a transport mechanism 40.

The ink container 2 stores a plurality of types of ink to be ejected onto the medium P. Examples of the color of the ink stored in the ink container 2 include black, cyan, magenta, yellow, red, and gray. Examples of the ink container 2 in which such ink is stored can include an ink cartridge, a bag-shaped ink pack formed of a flexible film, and an ink tank that can be refilled with ink.

The control mechanism 10 includes a processing circuit such as a central processing unit (CPU) and a field programmable gate array (FPGA), and a storage circuit such as a semiconductor memory, and controls respective components, including the print head 20, of the liquid ejection apparatus 1.

The carriage 21 on which the print head 20 is mounted is fixed to an endless belt 32 included in the movement mechanism 30. Note that the ink container 2 may be mounted on the carriage 21.

A control signal Ctrl-H for controlling the print head 20 output by the control mechanism 10 and a drive signal COM for driving the print head 20 are input to the print head 20 mounted on the carriage 21. Further, the ink stored in the ink container 2 is supplied to the print head 20 via a tube (not shown). The print head 20 then ejects the ink supplied from the ink container 2 based on the input control signal Ctrl-H and the input drive signal COM.

The movement mechanism 30 includes a carriage motor 31 and the endless belt 32. The carriage motor 31 operates based on a control signal Ctrl-C input from the control mechanism 10. The endless belt 32 rotates according to the operation of the carriage motor 31. As a result, the carriage 21 fixed to the endless belt 32 reciprocates along the scanning axis. That is, the carriage 21 reciprocates along the scanning axis that intersects with the transport direction in which the medium P is transported.

The transport mechanism 40 includes a transport motor 41 and a transport roller 42. The transport motor 41 operates based on a control signal Ctrl-T input from the control mechanism 10. The transport roller 42 rotates according to the operation of the transport motor 41. As the transport roller 42 rotates, the medium P is transported in the transport direction.

As described above, in the liquid ejection apparatus 1, the print head 20 mounted on the carriage 21 ejects the ink onto the medium P in conjunction with the transport of the medium P by the transport mechanism 40 and the reciprocating movement of the carriage 21 by the movement mechanism 30. As a result, the ink lands on an any position on the surface of the medium P to form a desired image on the medium P.

2. Functional Configuration of Liquid Ejection Apparatus

Figure 2:
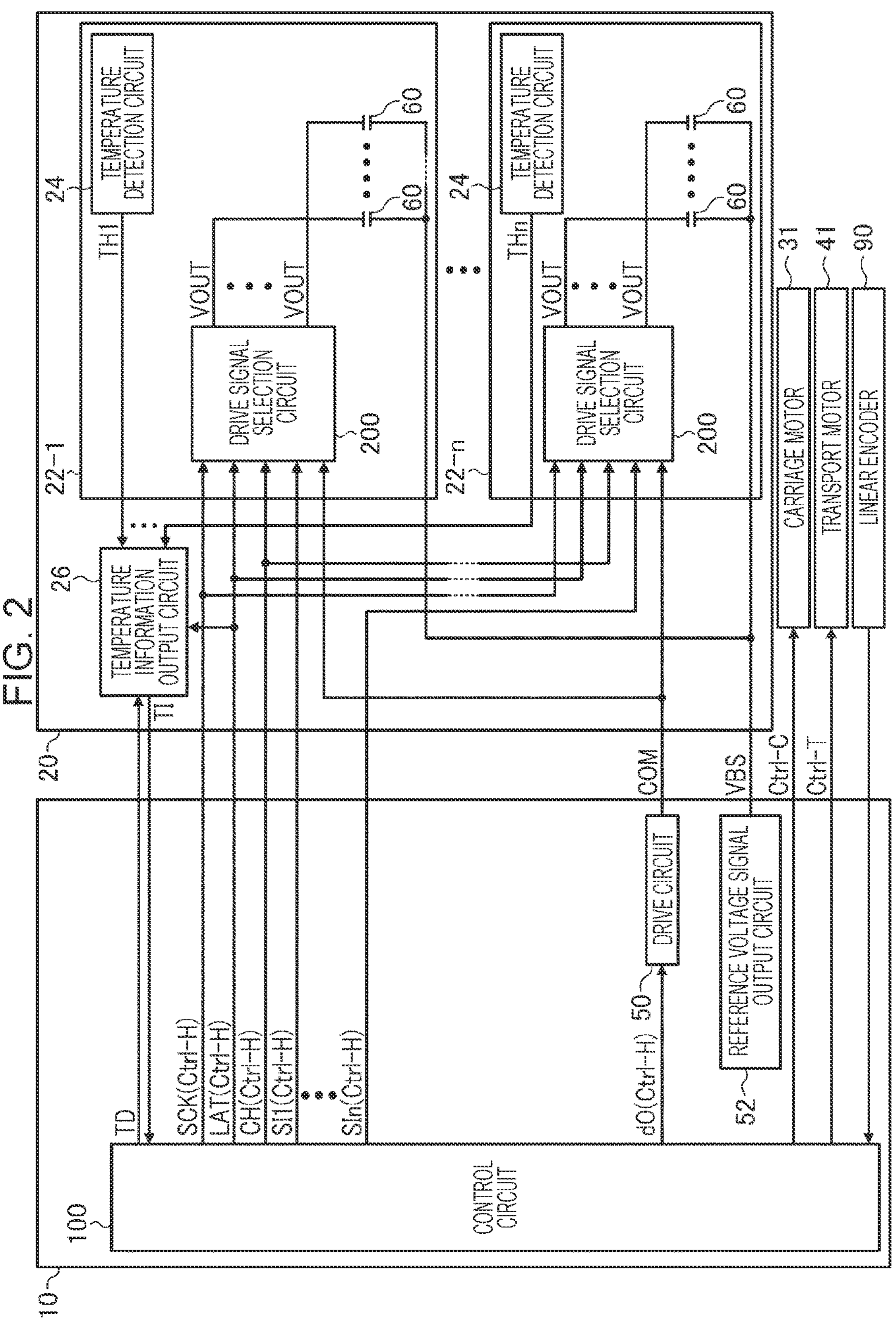
FIG. 2 is a diagram showing the functional configuration of the liquid ejection apparatus.

Next, the functional configuration of the liquid ejection apparatus 1 will be described. FIG. 2 is a diagram showing the functional configuration of the liquid ejection apparatus 1. As shown in FIG. 2, the liquid ejection apparatus 1 includes the control mechanism 10, the print head 20, the carriage motor 31, the transport motor 41, and a linear encoder 90.

The control mechanism 10 includes a drive circuit 50, a reference voltage signal output circuit 52, and a control circuit 100. The control circuit 100 includes, for example, a processing circuit such as a CPU and an FPGA, and a storage circuit such as a semiconductor memory. An image information signal including image data and the like is input to the control circuit 100 from an external device such as a host computer that is communicably connected to the outside of the liquid ejection apparatus 1. The control circuit 100 generates various signals for controlling the liquid ejection apparatus 1 based on the input image information signal to output the generated signals to the corresponding components.

Specifically, in addition to the image information signal described above, a detection signal based on the scanning position of the carriage 21 is input from the linear encoder 90 to the control circuit 100. The control circuit 100 determines the scanning position of the print head 20 mounted on the carriage 21 based on the input detection signal. The control circuit 100 then generates and outputs various signals according to the scanning position of the print head 20 and the image information signal.

Specifically, the control circuit 100 generates the control signal Ctrl-C for controlling the movement of the print head 20 along the scanning axis according to the scanning position of the print head 20 to output the generated signal to the carriage motor 31. As a result, the carriage motor 31 operates, and the movement and the scanning position of the print head 20 mounted on the carriage 21 along the scanning axis are controlled. Further, the control circuit 100 generates the control signal Ctrl-T for controlling the transport of the medium P to output the generated signal to the transport motor 41. As a result, the transport motor 41 operates, and the movement of the medium P along the transport direction is controlled. The control signal Ctrl-C may be signal converted via a driver circuit (not shown) and then input to the carriage motor 31, and the control signal Ctrl-T may be signal converted via a driver circuit (not shown) and then input to the transport motor 41.

The control circuit 100 generate print data signals SI1 to SIn, a change signal CH, a latch signal LAT, and a clock signal SCK to output the generated signals to the print head 20 as the control signals Ctrl-H for controlling the print head 20 based on an image information signal input from an external device and a scanning position of the print head 20 input from the linear encoder 90.

Further, the control circuit 100 generates a temperature acquisition request signal TD for acquiring the temperature of the print head 20 at a predetermined timing to output the generated signal to the print head 20. Further, the control circuit 100 receives a temperature information signal TI output from the print head 20 according to the temperature acquisition request signal TD. That is, the temperature information signal TI including information about the temperature of the print head 20 is input to the control circuit 100. The control circuit 100 then corrects the control signals Ctrl-H, Ctrl-C, and Ctrl-T based on the input temperature information signal TI.

Further, the control circuit 100 outputs a base drive signal dO, which is a digital signal, to the drive circuit 50 as the control signal Ctrl-H. The drive circuit 50 performs a digital/analog signal conversion on the input base drive signal dO, then performs class D amplification on the converted analog signal, and generates the drive signal COM to output the generated drive signal COM to the print head 20. That is, the base drive signal dO output by the control circuit 100 is a digital signal that defines the waveform of the drive signal COM. Here, the control circuit 100 corrects the base drive signal dO based on the input temperature information signal TI. That is, the drive circuit 50 outputs the drive signal COM corrected based on the temperature information signal TI. Note that the base drive signal dO is only required to be able to define the waveform of the drive signal COM output by the drive circuit 50, and may be an analog signal.

The reference voltage signal output circuit 52 generates a reference voltage signal VBS to output the generated signal to the print head 20. The reference voltage signal VBS output by the reference voltage signal output circuit 52 is a signal with a potential that serves as a reference for driving a piezoelectric element 60, which will be described later, and, for example, may be a constant signal with a ground potential, or may be a constant DC voltage signal with a potential such as 5.5 V or 6 V.

The print head 20 includes ejection modules 22-1 to **22-*n* and a temperature information output circuit 26. Further, each of the ejection modules 22-1 to 22-*n* includes a drive signal selection circuit 200, a temperature detection circuit 24, and a plurality of piezoelectric elements 60**.

The ejection module 22-1 receives the print data signal SI1, the change signal CH, the latch signal LAT, and the clock signal SCK output from the control circuit 100, the drive signal COM output from the drive circuit 50, and the reference voltage signal VBS output by the reference voltage signal output circuit 52.

The clock signal SCK, the latch signal LAT, the change signal CH, the print data signal SI1, and the drive signal COM input to the ejection module 22-1 are input to the drive signal selection circuit 200. The drive signal selection circuit 200 selects or unselects the signal waveform of the drive signal COM based on the clock signal SCK, the latch signal LAT, the change signal CH, and the print data signal SI1 that are input, and generates a drive signal VOUT corresponding to each of the plurality of piezoelectric elements 60 to output the generated signal to one end of the corresponding piezoelectric element 60 individually. Further, the reference voltage signal VBS is commonly input to the other ends of the plurality of piezoelectric elements 60. Each of the plurality of piezoelectric elements 60 is driven by a potential difference between the drive signal VOUT that is individually input to one end and the reference voltage signal VBS that is commonly input to the other end. An amount of ink corresponding to the drive of the piezoelectric element 60 is ejected from the ejection module 22-1.

The temperature detection circuit 24 included in the ejection module 22-1 detects a temperature of the ejection module 22-1 and acquires the detected temperature as temperature information tc1. Then, the temperature detection circuit 24 included in the ejection module 22-1 generates a temperature detection signal TC1 including the acquired temperature information tc1 to output the generated signal to the temperature information output circuit 26.

Here, the ejection modules 22-2 to **22-*n* have the same configuration as the ejection module 22-1**, except for input signals and output signals, and perform a similar operation.

That is, the clock signal SCK, the latch signal LAT, the change signal CH, a print data signal SIp, the drive signal COM, and the reference voltage signal VBS are input to the ejection module **22-*p* (p is any one of 1 to n). The drive signal selection circuit 200 included in the ejection module 22-*p* selects or unselects the signal waveform of the drive signal COM based on the clock signal SCK, the latch signal LAT, the change signal CH, and the print data signal SIp that are input, and generates the drive signal VOUT corresponding to each of the plurality of piezoelectric elements 60. The drive signal VOUT generated by the drive signal selection circuit 200 is individually input to one end of the corresponding piezoelectric element 60. Further, the reference voltage signal VBS is commonly input to the other ends of the plurality of piezoelectric elements 60 included in the ejection module 22-*p*. As a result, each of the plurality of piezoelectric elements 60 included in the ejection module 22-*p* is driven, and an amount of ink corresponding to the driving of the piezoelectric element 60 is ejected from the ejection module 22-*p***.

Further, the temperature detection circuit 24 included in the ejection module **22-*p* detects a temperature of the ejection module 22-*p* and acquires the detected temperature as temperature information tcp. Then, the temperature detection circuit 24 included in the ejection module 22-*p* generates a temperature detection signal TCp including the acquired temperature information tcp to output the generated signal to the temperature information output circuit 26**.

Here, in the following description, when there is no need to distinguish between the ejection modules 22-1 to **22-*n*, they may be simply referred to as an ejection module 22. At this time, the description is made assuming that the ejection module 22 receives the clock signal SCK, the latch signal LAT, the change signal CH, the print data signal SI, the drive signal COM, and the reference voltage signal VBS, acquires temperature information tc corresponding to the temperature of the ejection module 22**, and outputs a temperature detection signal TC including the temperature information tc.

The temperature information output circuit 26 receives the temperature detection signals TC1 to TCn output from the respective ejection modules 22-1 to **22-*n*, the temperature acquisition request signal TD output from the control circuit 100, and the latch signal LAT. Based on the temperature acquisition request signal TD, the temperature information output circuit 26 acquires the temperature information tc1 to tcn included in the temperature detection signals TC1 to TCn, respectively, at the timing defined by the latch signal LAT to output the temperature information signal TI corresponding to the acquired temperature information tc1** to tcn.

As described above, the liquid ejection apparatus 1 of the present embodiment includes the control circuit 100 that outputs the clock signal SCK, the latch signal LAT, the change signal CH, and the print data signal SI, the drive circuit 50 that outputs the drive signal COM, and the print head 20 that ejects the ink by receiving the clock signal SCK, the latch signal LAT, the change signal CH, the print data signal SI, and the drive signal COM. In such a liquid ejection apparatus 1, the clock signal SCK, the latch signal LAT, the change signal CH, and the print data signal SI output by the control circuit 100 and the drive signal COM output by the drive circuit 50 are corrected according to the output temperature information signal TI output by the print head 20. That is, the liquid ejection apparatus 1 of the present embodiment includes the drive circuit 50 that outputs the drive signal COM corrected based on the temperature information signal TI, the control circuit 100 that corrects the drive signal COM, and the print head 20 that ejects the ink by receiving the corrected drive signal COM, and the print head 20 includes the ejection module 22 that ejects the ink by receiving the corrected drive signal COM and the temperature information output circuit 26 that outputs the temperature information signal TI indicating the temperature of the ejection module 22.

3. Functional Configuration of Drive Signal Selection Circuit

Next, the configuration and the operation of the drive signal selection circuit 200 included in the ejection module 22 will be described. As described above, the drive signal selection circuit 200 included in the ejection module 22 selects or unselects the signal waveform included in the drive signal COM based on the clock signal SCK, the print data signal SI, the latch signal LAT, and the change signal CH, and generates the drive signal VOUT to output the generated signal to the corresponding piezoelectric element 60. In describing the configuration and the operation of the drive signal selection circuit 200, an example of the waveform of the drive signal COM input to the drive signal selection circuit 200 will be described first.

Figure 3:
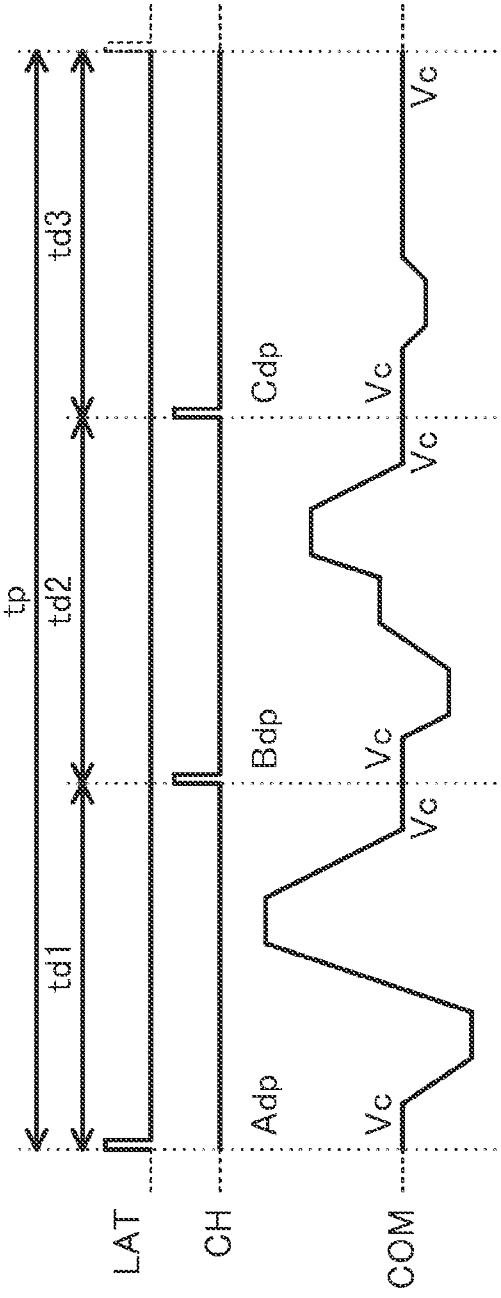
FIG. 3 is a diagram showing an example of a signal waveform of a drive signal COM.

FIG. 3 is a diagram showing an example of the signal waveform of the drive signal COM. As shown in FIG. 3, the drive signal COM includes a trapezoidal waveform Adp disposed in a period td1 from when the latch signal LAT rises to when the change signal CH rises, a trapezoidal waveform Bdp disposed in a period td2 from when the change signal CH rises to when the change signal CH rises next, and a trapezoidal waveform Cdp disposed in a period td3 from when the change signal CH rises to when the latch signal LAT rises.

The trapezoidal waveform Adp is a signal waveform that drives the piezoelectric element 60 so that a predetermined amount of ink is ejected, and the trapezoidal waveform Bdp is a signal waveform that drives the piezoelectric element 60 so that a smaller amount of ink than the predetermined amount is ejected. The trapezoidal waveform Cdp is a signal waveform that drives the piezoelectric element 60 to such an extent that the ink is not ejected, and a signal waveform for reducing the possibility of increase in viscosity of the ink near the nozzle opening by vibrating the ink near the nozzle opening corresponding to the piezoelectric element 60. Furthermore, the trapezoidal waveforms Adp, Bdp, and Cdp have a common signal waveform in which the voltage value at the start timing and the end timing is a voltage Vc. That is, each of the trapezoidal waveforms Adp, Bdp, and Cdp starts at the voltage Vc and ends at the voltage Vc.

Here, in the following description, a predetermined amount of ink ejected when the trapezoidal waveform Adp is supplied to the piezoelectric element 60 may be referred to as a medium amount, and an amount of ink that is smaller than the predetermined amount to be ejected when the trapezoidal waveform Bdp is supplied to the piezoelectric element 60 may be referred to as a small amount. Furthermore, the operation for vibrating the ink near the nozzle opening corresponding to the piezoelectric element 60 when the trapezoidal waveform Cdp is supplied to the piezoelectric element 60 to prevent an increase in ink viscosity may be referred to as a slight vibration. Note that the signal waveform of the drive signal COM shown in FIG. 3 is an example and the present disclosure is not limited to this, and a combination of various waveforms may be used depending on the properties of the ejected ink and the material of the medium P on which the ink lands.

Then, the drive signal selection circuit 200 selects or unselects the trapezoidal waveform Adp, Bdp, or Cdp included in the drive signal COM in a cycle tp including the above-mentioned periods td1, td2, and td3, so that the amount of ink ejected is controlled. In other words, the dot size formed on the medium P in the cycle tp is controlled. The cycle tp including the periods td1, td2, and td3 is a dot formation period in which dots of a predetermined size are formed on the medium P, and corresponds to an ejection cycle in which the ink is ejected onto the medium P. That is, the latch signal LAT defines the cycle tp corresponding to the ejection cycle of the ink from the ejection module 22.

Figure 4:
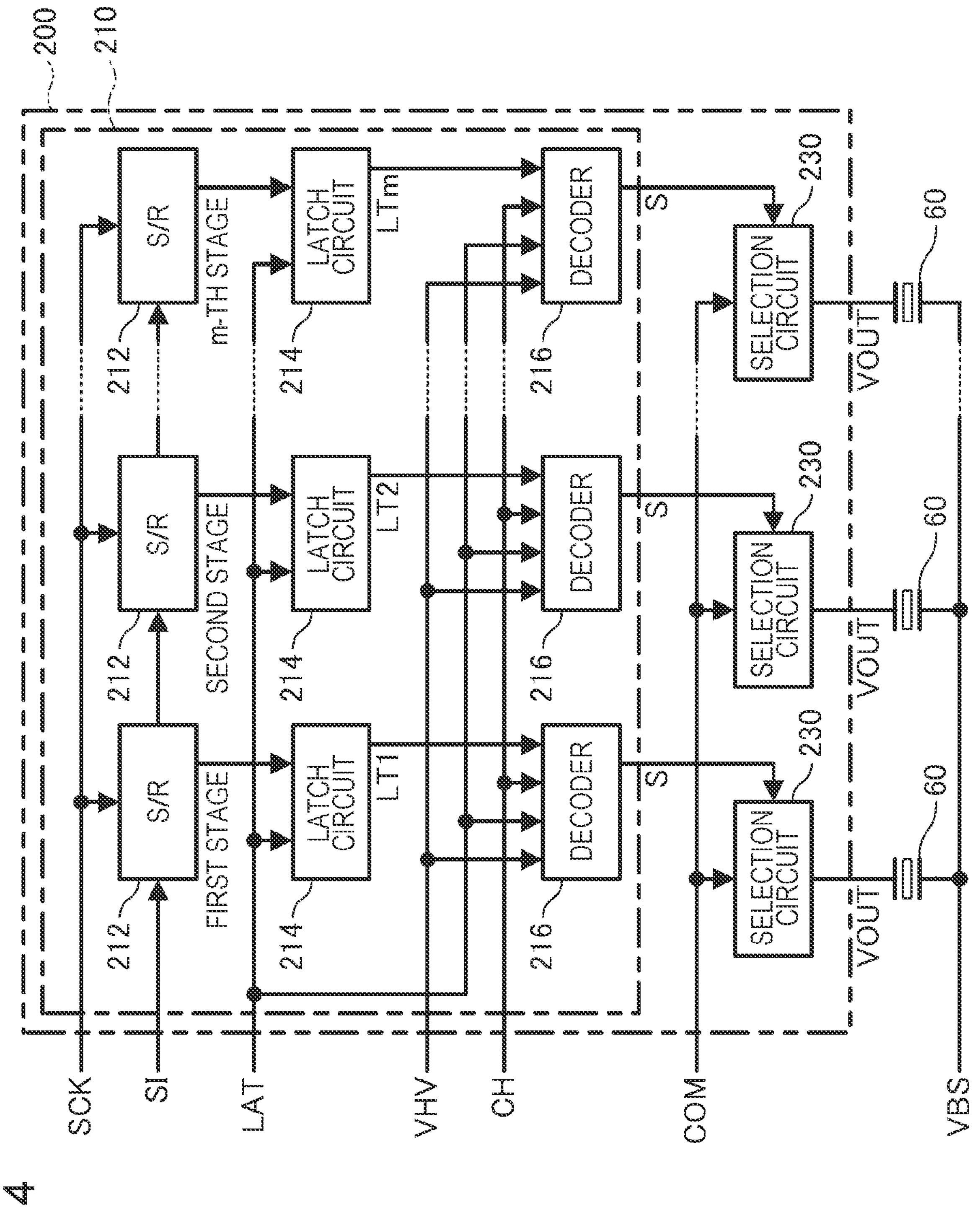
FIG. 4 is a diagram showing the configuration of a drive signal selection circuit.

Next, the configuration and the operation of the drive signal selection circuit 200 that generates the drive signal VOUT by selecting or unselecting the signal waveform included in the drive signal COM will be described. FIG. 4 is a diagram showing the configuration of the drive signal selection circuit 200. As shown in FIG. 4, the drive signal selection circuit 200 includes a selection control circuit 210 and selection circuits 230 the number of which is same as the number of piezoelectric elements 60. In addition, in the following description, the ejection module 22 will be described as having m piezoelectric elements 60.

The selection control circuit 210 receives the clock signal SCK, the print data signal SI, the latch signal LAT, and the change signal CH. Further, the selection control circuit 210 includes a set of a shift register (S/R) 212, a latch circuit 214, and a decoder 216, corresponding to each of m piezoelectric elements 60. That is, the drive signal selection circuit 200 includes m shift registers 212, m latch circuits 214, and m decoders 216.

The print data signal SI is input to the selection control circuit 210 in synchronization with the clock signal SCK. In addition, the print data signal SI includes 2-bit print data [SIH, SIL] for selecting any one of a "large dot LD", a "medium dot MD", a "small dot SD", and a "no dots recorded ND" serially corresponding to each of m piezoelectric elements 60. The print data [SIH, SIL] included in the print data signal SI is held in m shift registers 212 corresponding to m piezoelectric elements 60. Specifically, m shift registers 212 corresponding to the piezoelectric elements 60 are coupled in cascade to each other, and the serially input print data signal SI is sequentially transferred to the subsequent shift register 212 in accordance with the clock signal SCK. Then, by holding the print data [SIH, SIL] in the corresponding shift register 212, the clock signal SCK is stopped. As a result, the print data [SIH, SIL] included in the print data signal SI is held in the corresponding shift register 212. In FIG. 4, in order to distinguish between m shift registers 212, they are denoted as the first stage, the second stage, . . . , the m-th stage in order starting from the upstream shift register to which the print data signal SI is input.

Figures 5, 6:
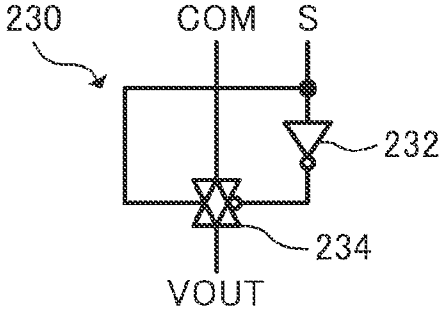
FIG. 5 is a diagram showing an example of decoded content in a decoder.
FIG. 6 is a diagram showing the configuration of a selection circuit.

Each of m latch circuits 214 simultaneously latches the print data [SIH, SIL] held in the corresponding shift register 212 at the rising edge of the latch signal LAT. The print data [SIH, SIL] latched by the latch circuit 214 is input to the corresponding decoder 216. FIG. 5 is a diagram showing an example of decoded content in the decoder 216. The decoder 216 outputs a selection signal S having a logic level defined by the input print data [SIH, SIL] in each of the periods td1, td2, and td3. For example, when the print data [SIH, SIL]=[1, 0] is input to the decoder 216, the decoder 216 sets the logic level of the selection signal S to H, L, and L levels in the periods td1, td2, and td3 for outputting.

The selection signal S output from the decoder 216 is input to the selection circuit 230. The selection circuit 230 is provided corresponding to each of m piezoelectric elements 60. That is, the drive signal selection circuit 200 has m piezoelectric elements 60 whose number is the same as the number of selection circuits 230. FIG. 6 is a diagram showing the configuration of the selection circuit 230. As shown in FIG. 6, the selection circuit 230 includes an inverter 232 that is a NOT circuit, and a transfer gate 234.

The selection signal S is input to the non-circled positive control end of the circle in the transfer gate 234, and is input to the circled negative control end of the transfer gate 234 after its logic level is inverted by the inverter 232. Furthermore, the drive signal COM is supplied to the input end of the transfer gate 234. The transfer gate 234 brings the input end and the output end into a conductive state when the selection signal S with high level is input, and brings the input end and the output end into a non-conductive state when the selection signal S with low level is input. That is, the transfer gate 234 outputs the signal waveform included in the drive signal COM from the output end when the logic level of the selection signal S is high level, and does not output the signal waveform included in the drive signal COM from the output end when the logic level of the selection signal S is low level. The drive signal selection circuit 200 then outputs the signal output to the output end of the transfer gate 234 included in the selection circuit 230 as the drive signal VOUT.

Figure 7:
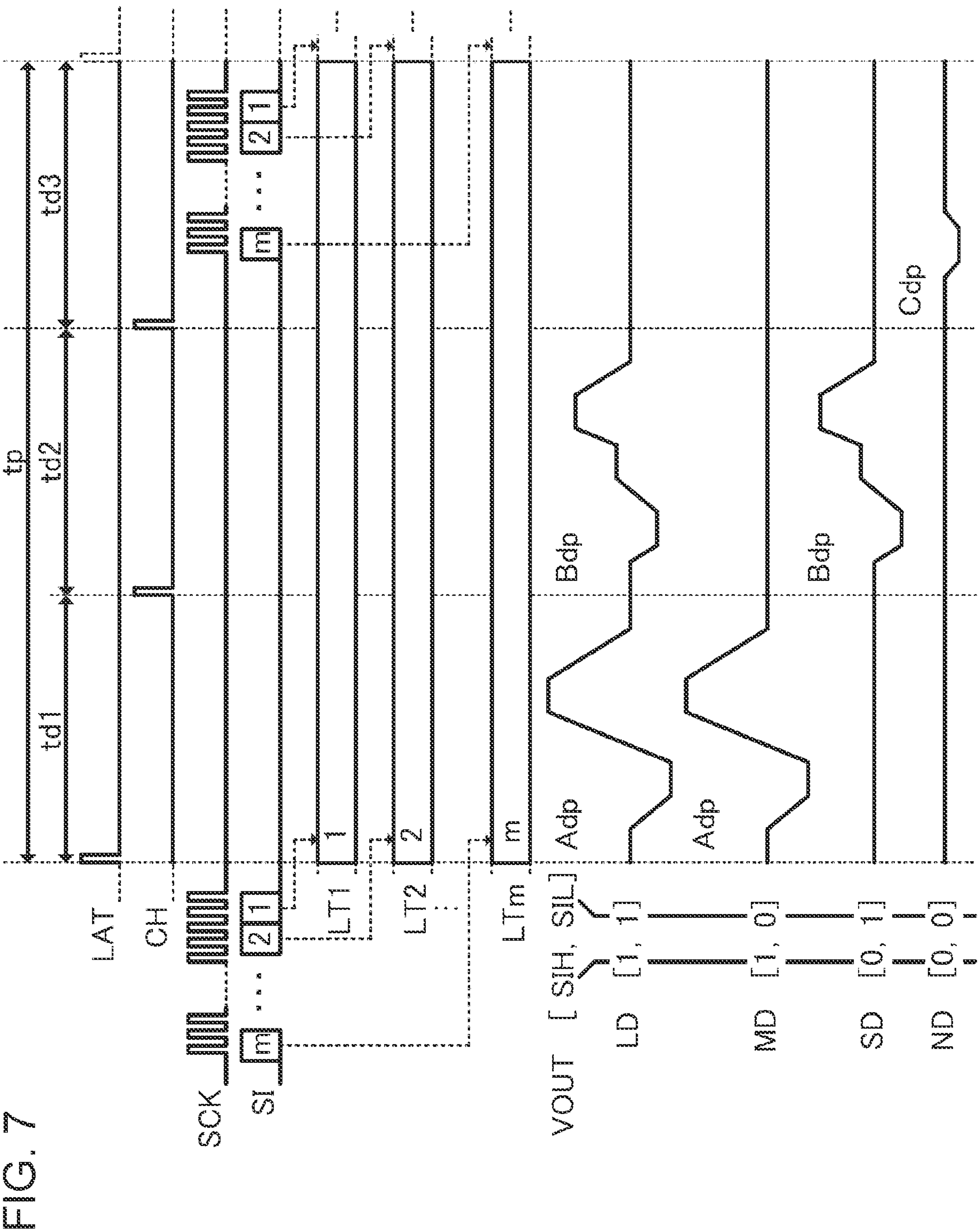
FIG. 7 is a diagram for describing the operation of the drive signal selection circuit.

Here, the operation of the drive signal selection circuit 200 will be described using FIG. 7. FIG. 7 is a diagram for describing the operation of the drive signal selection circuit 200. The print data signal SI is input to the selection control circuit 210 as a serial signal synchronized with the clock signal SCK. Then, the print data signal SI is sequentially transferred to m shift registers 212 corresponding to m piezoelectric elements 60 in synchronization with the clock signal SCK. Thereafter, when the input of the clock signal SCK is stopped, the shift register 212 holds the print data [SIH, SIL] corresponding to each of m piezoelectric elements 60. The print data signal SI is input to the shift registers 212 of the m-th stage, . . . , the second stage, the first stage in the order of the corresponding piezoelectric elements 60.

When the latch signal LAT rises, the latch circuits 214 simultaneously latches the print data [SIH, SIL] held in the respective shift registers 212. LT1, LT2, . . . , LTm shown in FIG. 7 indicate the print data [SIH, SIL] latched by the latch circuits 214 corresponding to the shift registers 212 of the first stage, the second stage, . . . , the m-th stage, respectively.

The decoder 216 outputs the logic level of the selection signal S with the content as shown in FIG. 5 in each of the periods td1, td2, and td3 according to the dot size defined by the latched print data [SIH, SIL]. Then, the selection circuit 230 generates the drive signal VOUT by selecting or unselecting the signal waveform included in the drive signal COM according to the logic level of the selection signal S output by the decoder 216.

Specifically, when the print data [SIH, SIL]=[1, 1] is input to the decoder 216, the decoder 216 sets the logic level of the selection signal S to H, H, and L levels during the periods td1, td2, and td3, respectively. As a result, the selection circuit 230 selects the trapezoidal waveform Adp during the period td1, selects the trapezoidal waveform Bdp during the period td2, and does not select the trapezoidal waveform Cdp during the period td3. As a result, the drive signal selection circuit 200 outputs the drive signal VOUT corresponding to the "large dot LD".

When the drive signal VOUT corresponding to the "large dot LD" is supplied to the piezoelectric element 60, a medium amount of ink is ejected in the period td1, a small amount of ink is ejected in the period td2, and no ink is ejected in the period td3. Then, the medium amount of ink and the small amount of ink that are ejected land on the medium P and combine, thereby forming the "large dot LD" on the medium P.

Further, when the print data [SIH, SIL]=[1, 0] is input to the decoder 216, the decoder 216 sets the logic level of the selection signal S to H, L, and L levels during the periods td1, td2, and td3, respectively. As a result, the selection circuit 230 selects the trapezoidal waveform Adp during the period td1, does not select the trapezoidal waveform Bdp during the period td2, and does not select the trapezoidal waveform Cdp during the period td3. As a result, the drive signal selection circuit 200 outputs the drive signal VOUT corresponding to the "medium dot MD".

When the drive signal VOUT corresponding to the "medium dot MD" is supplied to the piezoelectric element 60, a medium amount of ink is ejected in the period td1, no ink is ejected in the period td2, and no ink is ejected in the period td3. Then, the medium amount of ink ejected lands on the medium P, thereby forming the "medium dots MD" on the medium P.

Further, when the print data [SIH, SIL]=[0, 1] is input to the decoder 216, the decoder 216 sets the logic level of the selection signal S to L, H, and L levels during the periods td1, td2, and td3, respectively. As a result, the selection circuit 230 does not select the trapezoidal waveform Adp in the period td1, selects the trapezoidal waveform Bdp in the period td2, and does not select the trapezoidal waveform Cdp in the period td3. As a result, the drive signal selection circuit 200 outputs the drive signal VOUT corresponding to the "small dot SD".

When the drive signal VOUT corresponding to the "small dot SD" is supplied to the piezoelectric element 60, no ink is ejected in the period td1, a small amount of ink is ejected in the period td2, and no ink is ejected in the period td3. Then, the small amount of ink ejected lands on the medium P, thereby forming the "small dot SD" on the medium P.

Further, when the print data [SIH, SIL]=[0, 0] is input to the decoder 216, the decoder 216 sets the logic level of the selection signal S to L, L, and H levels during the periods td1, td2, and td3, respectively. As a result, the selection circuit 230 does not select the trapezoidal waveform Adp in the period td1, does not select the trapezoidal waveform Bdp in the period td2, and selects the trapezoidal waveform Cdp in the period td3. As a result, the drive signal selection circuit 200 outputs the drive signal VOUT corresponding to the "no dots recorded ND".

When the drive signal VOUT corresponding to the "no dots recorded ND" is supplied to the piezoelectric element 60, no ink is ejected in the period td1, no ink is ejected in the period td2, and no ink is ejected in the period td3. Therefore, no ink is ejected from the ejection unit 600, resulting in the "no dots recorded ND" where no dots are formed on the medium P. At this time, the drive signal VOUT including the trapezoidal waveform Cdp is input to the corresponding piezoelectric element 60. Therefore, a slight vibration is performed. As a result, the possibility that the ink viscosity near the nozzle opening of the corresponding ejection unit 600 will increase is reduced.

As described above, in the liquid ejection apparatus 1 of the present embodiment, the ejection module 22 includes the piezoelectric element 60 that is driven by being supplied with the drive signal COM, and the ink, which is an example of a liquid, is ejected by driving the piezoelectric element 60.

4. Structure of Ejection Module

Figure 8:
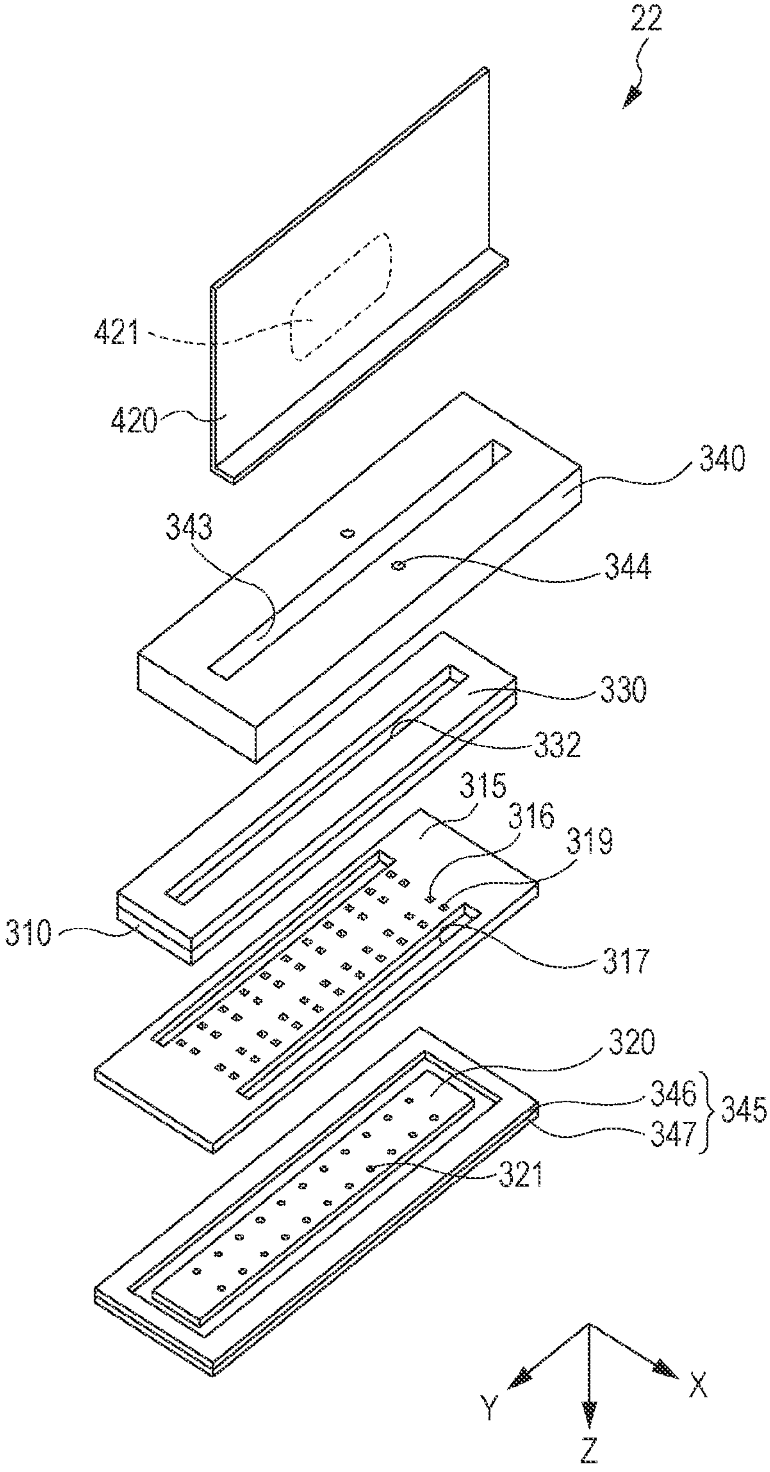
FIG. 8 is an exploded perspective view showing the structure of an ejection module.
Figure 9:
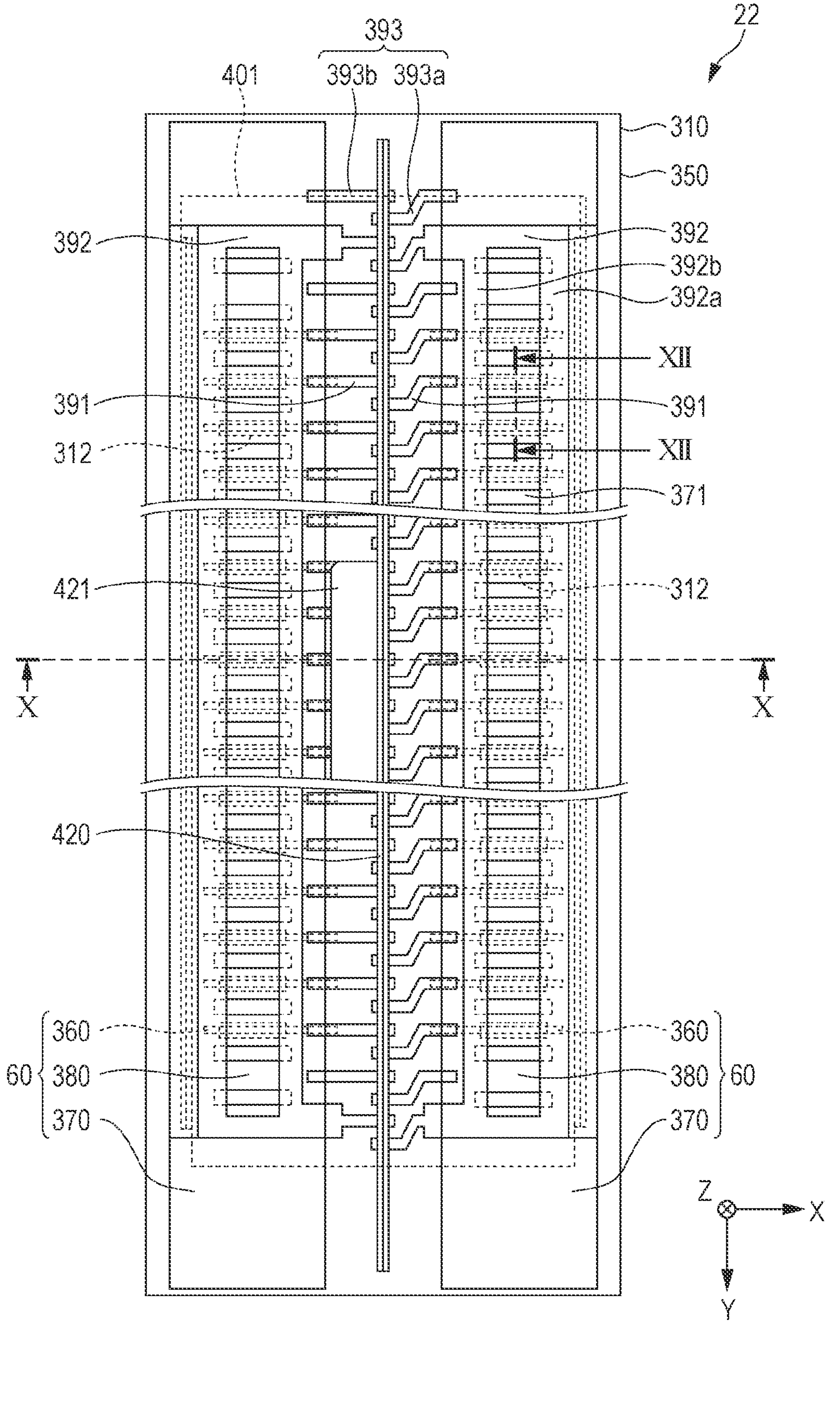
FIG. 9 is a plan view of the ejection module.
Figure 10:
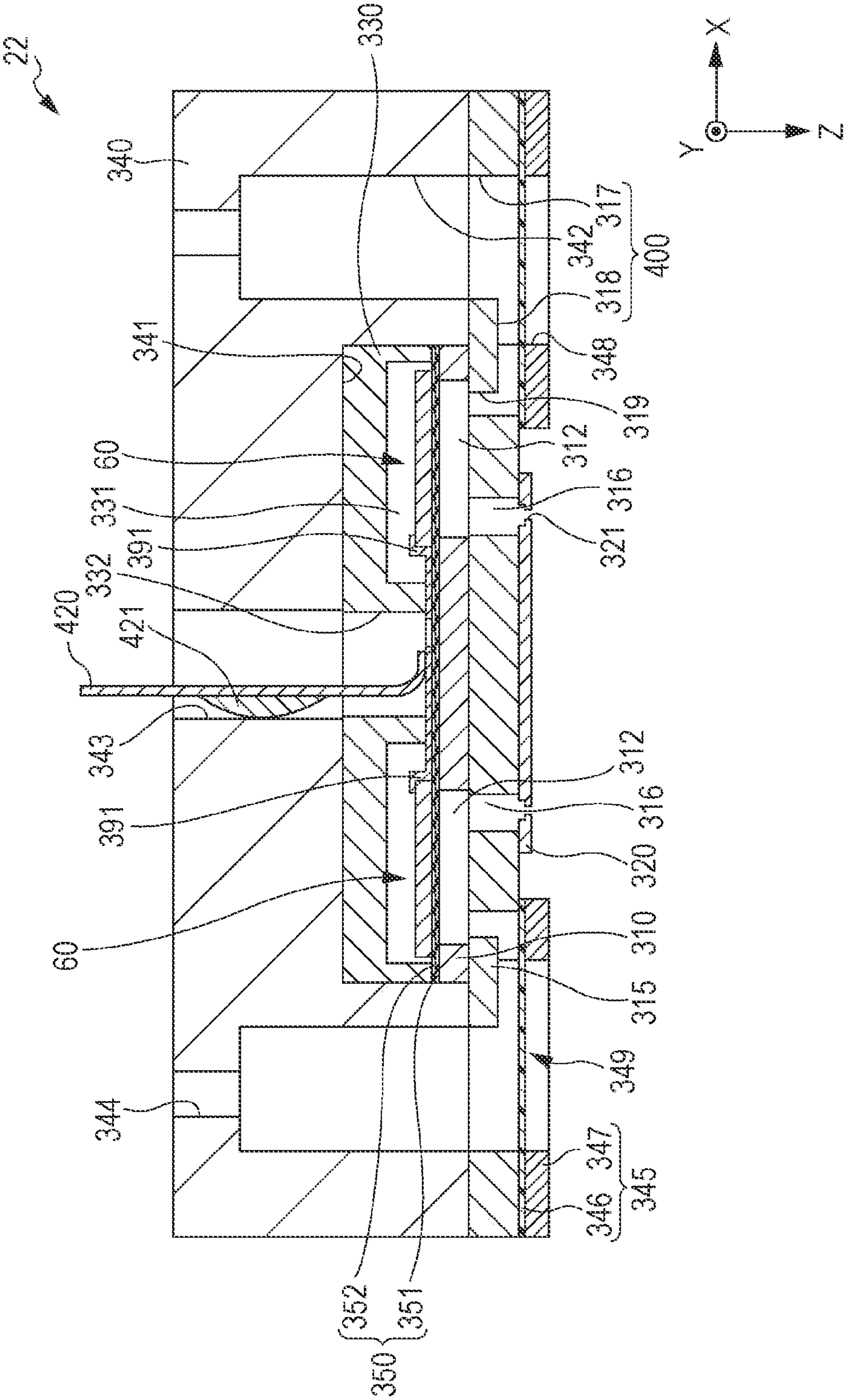
FIG. 10 is a cross-sectional view taken along line X-X shown in FIG. 9.
Figure 11:
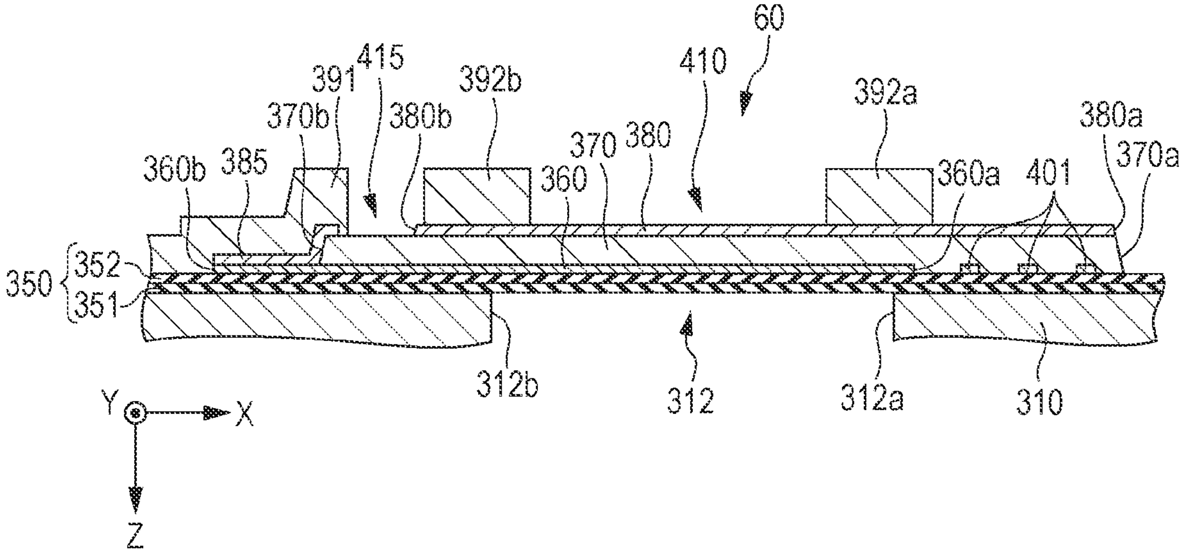
FIG. 11 is a detailed view of the main portion of FIG. 10.
Figure 12:
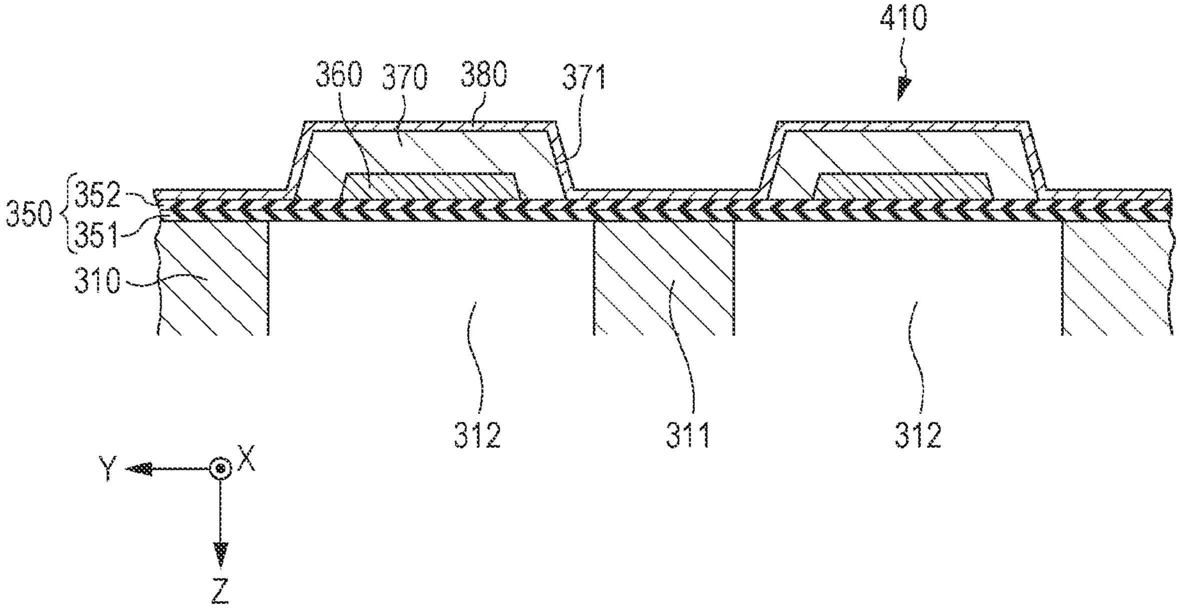
FIG. 12 is a cross-sectional view taken along line XII-XII shown in FIG. 9.

Next, the structure of the ejection module 22 included in the print head 20 will be described. FIG. 8 is an exploded perspective view showing the structure of the ejection module 22, FIG. 9 is a plan view of the ejection module 22, and FIG. 10 is a cross-sectional view taken along line X-X shown in FIG. 9, FIG. 11 is a detailed view of the main portion of FIG. 10, and FIG. 12 is a cross-sectional view taken along line XII-XII shown in FIG. 9. Here, in describing the structure of the ejection module 22, the following description, three spatial axes that are orthogonal to each other: an X axis, a Y axis, and a Z axis are used. When identifying the respective directions of the X axis, the Y axis, and the Z axis, the starting point side of the arrow indicating the direction along the X axis shown in the figure may be referred to as the −X side, and the distal end side may be referred to as the +X side, the starting point side of the arrow indicating the direction along the Y axis shown in the figure may be referred to as the −Y side and the distal end side may be referred to as the +Y side, and the starting point side of the arrow indicating the direction along the Z axis shown in the figure may be referred to as the −Z side and the distal end side may be referred to as the +Z side.

As shown in FIG. 8, the ejection module 22 ejects the ink from the −Z side toward the +Z side along the Z axis. The ejection module 22 includes a pressure chamber substrate 310, a communication plate 315, a nozzle plate 320, a compliance substrate 345, a protection substrate 330, a case member 340, a wiring substrate 420, a vibration plate 350 (described later), and the piezoelectric element 60 (described later).

As shown in FIG. 9, pressure chamber rows, in the pressure chamber substrate 310, in which a plurality of pressure chambers 312 is lined up along the Y axis are disposed in two rows in the direction along the X axis. Here, among the two pressure chamber rows disposed in the pressure chamber substrate 310, the pressure chamber row disposed on the +X side may be referred to as a first pressure chamber row, and the pressure chamber row disposed on the −X side of the first pressure chamber row may be referred to as a second pressure chamber row. Note that FIG. 9 is a plan view of the ejection module 22, the configuration around the pressure chamber substrate 310 is mainly illustrated, and illustration of the protection substrate 330 and the case member 340 is omitted.

The plurality of pressure chambers 312 constituting each pressure chamber row is disposed on a straight line along the Y axis so that their positions in the direction along the X axis are approximately the same. The pressure chambers 312 adjacent to each other along the Y axis are partitioned by a partition wall 311 shown in FIG. 12. Note that the arrangement of the pressure chambers 312 is not limited to the arrangement described above, and for example, the plurality of pressure chambers 312 constituting each pressure chamber row may be disposed in a so-called staggered arrangement in which the positions of the pressure chambers 312 in the direction along the X axis are shifted. In addition, while the shape of the pressure chamber 312 will be described as a rectangle in which the length in the X axis direction is longer than the length in the Y axis direction in plan view from the +Z side, the shape of the pressure chamber 312 in plan view from the +Z side is not limited to this, but may be, for example, a parallelogram, a polygon, a circle, an oval, or the like. Here, the oval shape is basically a rectangular shape with a semicircular shape at each of both ends in the longitudinal direction, and includes a rounded rectangular shape, an elliptical shape, an egg shape, and the like.

As shown in FIGS. 8 and 10, the communication plate 315, and the nozzle plate 320 and the compliance substrate 345 are stacked on the +Z side of the pressure chamber substrate 310.

The communication plate 315 is provided with a nozzle communication passage 316 that communicates the pressure chamber 312 and a nozzle 321. Further, the communication plate 315 is provided with a first manifold portion 317 and a second manifold portion 318 that constitute part of a manifold 400 that communicates with the plurality of pressure chambers 312 and functions as a common liquid chamber. The first manifold portion 317 penetrates the communication plate 315 along the Z axis. The second manifold portion 318 is provided so as to open on the +Z side face of the communication plate 315 without penetrating the communication plate 315 along the Z axis.

Furthermore, the communication plate 315 is provided with a supply communication passage 319 that communicates with one end of the pressure chamber 312 in the direction along the X axis, the passage being provided independently corresponding to each pressure chamber 312. The supply communication passage 319 communicates the second manifold portion 318 with each pressure chamber 312, so that the ink stored inside the manifold 400 is supplied to each pressure chamber 312. Here, it is preferable that the communication plate 315 is made of a material having substantially the same coefficient of thermal expansion as the pressure chamber substrate 310. This reduces the possibility that at least one of the pressure chamber substrate 310 and the communication plate 315 will warp due to a difference in coefficient of thermal expansion when the temperatures of the pressure chamber substrate 310 and the communication plate 315 change.

The nozzle plate 320 is provided on a face, of the communication plate 315, opposite the pressure chamber substrate 310, that is, on the +Z side face of the communication plate 315. The nozzle plate 320 has the nozzle 321 that communicates with each pressure chamber 312 via the nozzle communication passage 316. That is, the nozzle plate 320 has the plurality of nozzles 321 corresponding to the plurality of pressure chambers 312.

The plurality of nozzles 321 is disposed side by side along the Y axis to form a nozzle row. The nozzle plate 320 has two nozzle rows formed by the plurality of nozzles 321 in the direction along the X axis. One of the two nozzle rows corresponds to the first pressure chamber row, and the other corresponds to the second pressure chamber row. The plurality of nozzles 321 in each nozzle row is formed along the Y axis so that their positions in the direction along the X axis are approximately the same. Note that the arrangement of the nozzles 321 is not limited to the arrangement described above, and for example, the plurality of nozzles 321 constituting each nozzle row may be disposed in a so-called staggered arrangement in which the positions of the nozzles in the direction along the X axis are shifted. Here, it is preferable that the nozzle plate 320 is made of a material having substantially the same coefficient of thermal expansion as the communication plate 315. This reduces the possibility that at least one of the nozzle plate 320 and the communication plate 315 will warp due to a difference in coefficient of thermal expansion when the temperatures of the nozzle plate 320 and the communication plate 315 change.

The compliance substrate 345 together with the nozzle plate 320 is provided on a face, of the communication plate 315, opposite the pressure chamber substrate 310, that is, on the +Z side face of the communication plate 315. Further, the compliance substrate 345 is provided around the nozzle plate 320 and seals the openings of the first manifold portion 317 and the second manifold portion 318 provided in the communication plate 315. The compliance substrate 345 includes a flexible sealing film 346 and a fixing substrate 347 made of a hard material. Furthermore, the compliance substrate 345 has an opening 348 where the fixing substrate 347 is completely removed in the thickness direction in in a region facing the manifold 400. That is, one face of the manifold 400 is a compliance portion 349 sealed only with the flexible sealing film 346.

On the other hand, the vibration plate 350 and the plurality of piezoelectric elements 60 that applies pressure to the ink stored in the pressure chamber 312 by flexibly deforming the vibration plate 350 are located on a side, of the pressure chamber substrate 310, opposite to the nozzle plate 320 and the like, that is, on the −Z side of the pressure chamber substrate 310. The plurality of piezoelectric elements 60 is disposed side by side along the Y axis on the −Z side face of the vibration plate 350. The vibration plate 350 has two rows of the plurality of piezoelectric elements 60 in the direction along the X axis. Note that in FIG. 10, the configuration of the piezoelectric element 60 is illustrated in a simplified manner.

Furthermore, the protection substrate 330 having approximately the same size as the pressure chamber substrate 310 is joined to the −Z side of the pressure chamber substrate 310 using an adhesive or the like. The protection substrate 330 has a holding portion 331 that is a space that protects the piezoelectric element 60. The holding portion 331 is provided independently for each row of piezoelectric elements 60 disposed side by side along the Y axis. That is, two holding portions 331 are formed side by side in the direction along the X axis. Further, the protection substrate 330 is provided with a through hole 332 that penetrates the protection substrate 330 in the direction along the Z axis between two holding portions 331 formed side by side in the direction along the X axis.

Further, the case member 340 is fixed on the protection substrate 330. The case member 340 together with the pressure chamber substrate 310 defines the manifold 400 that communicates with the plurality of pressure chambers 312. The case member 340 has substantially the same shape as the above-mentioned communication plate 315 in plan view from the −Z side, and is joined to the protection substrate 330 and also to the above-mentioned communication plate 315.

An accommodation portion 341 that is a space deep enough to accommodate the pressure chamber substrate 310 and the protection substrate 330 is formed on the protection substrate 330 side of the case member 340. The accommodation portion 341 has an opening area wider than a face where the protection substrate 330 is joined to the pressure chamber substrate 310. Then, with the pressure chamber substrate 310 and the protection substrate 330 accommodated in the accommodation portion 341, the opening face of the accommodation portion 341 on the nozzle plate 320 side is sealed by the communication plate 315.

Further, in the case member 340, a third manifold portion 342 is defined on each of both outer sides of the accommodation portion 341 in the direction along the X axis. Together with the first manifold portion 317 and the second manifold portion 318 provided on the communication plate 315, the third manifold portion 342 defined in the case member 340 constitutes the manifold 400. The manifold 400 is provided continuously in the direction along the Y axis, and the supply communication passages 319 that communicate the manifold 400 and respective pressure chambers 312 are disposed side by side in the direction along the Y axis.

Further, the case member 340 is provided with a supply port 344 that communicates with the manifold 400 and supplies the ink to the manifold 400. Further, the case member 340 has a coupling port 343 that communicates with the through hole 332 of the protection substrate 330 and into which the wiring substrate 420 is inserted.

The ink stored in the ink container 2 is taken in the ejection module 22 configured as described above from the supply port 344. After the inner portion of the manifold 400 to the nozzle 321 is filled with the ink supplied from the supply port 344, the drive signal VOUT based on the drive signal COM is supplied to the piezoelectric element 60 corresponding to each of the plurality of pressure chambers 312 from an integrated circuit 421 including the drive signal selection circuit 200. As a result, the piezoelectric element 60 is deformed, and along with the deformation of the piezoelectric element 60, the vibration plate 350 is deflected and deformed. As a result, the internal pressure of each pressure chamber 312 increases, and ink is ejected from the corresponding nozzle 321.

Next, the configuration the ejection module 22 in which components are stacked on the −Z side of the pressure chamber substrate 310 will be described in detail. In addition to the vibration plate 350 and the piezoelectric element 60 described above, an individual lead electrode 391, a common lead electrode 392, a measurement lead electrode 393, and resistance wiring 401 are stacked on the −Z side of the pressure chamber substrate 310 of the ejection module 22.

As shown in FIGS. 9 to 12, the vibration plate 350 includes an elastic film 351 made of silicon oxide provided on the pressure chamber substrate 310 side, and an insulating film 352 made of zirconium oxide provided on the −Z side of the elastic film 351. Of the liquid flow path such as the pressure chambers 312 formed by anisotropically etching the pressure chamber substrate 310 from the +Z side, the −Z side face is composed of the elastic film 351 included in the vibration plate 350. Note that the configuration of the vibration plate 350 is not limited to the above-mentioned configuration, and the vibration plate 350 may be configured with, for example, the elastic film 351 or the insulating film 352, or may include another film in addition to the elastic film 351 and the insulating film 352. Here, another film included in the vibration plate 350 includes, for example, a film containing silicon, silicon nitride, and the like.

The piezoelectric element 60 includes an electrode 360, a piezoelectric body 370, and an electrode 380, which are stacked from the +Z side toward the −Z side on the −Z side face of the vibration plate 350. That is, the piezoelectric element 60 includes the electrodes 360 and 380, and the piezoelectric body 370, and the electrode 360, the piezoelectric body 370, and the electrode 380 are stacked in this order in the direction along the Z axis.

The electrodes 360 and 380 are electrically coupled to the wiring substrate 420. As a result, the electrodes 360 and 380 supply the drive signal VOUT output by the drive signal selection circuit 200 included in the integrated circuit 421 mounted on the wiring substrate 420 and the reference voltage signal VBS propagating through the wiring substrate 420 to the piezoelectric body 370. That is, the electrode 360 of the piezoelectric element 60 is supplied with the drive signal VOUT whose voltage value changes depending on the amount of ink ejected from the nozzle 321, and the electrode 380 of the piezoelectric element 60 is supplied with the reference voltage signal VBS whose voltage value is constant regardless of the amount of ink ejected. This causes a potential difference between the electrode 360 and the electrode 380, and as a result, the piezoelectric body 370 is deformed. That is, the piezoelectric element 60 is driven. Then, as the piezoelectric element 60 is driven, the vibration plate 350 deforms or vibrates, and the volume of the pressure chamber 312 changes. The change in volume of the pressure chamber 312 applies pressure to the ink stored in the pressure chamber 312. As a result, the ink is ejected from the nozzle 321 via the nozzle communication passage 316.

Here, in the following description, a portion of the piezoelectric element 60 where piezoelectric strain occurs in the piezoelectric body 370 when a voltage is applied to the electrode 360 and the electrode 380 is referred to as an active portion 410, and a portion where no piezoelectric strain occurs in the piezoelectric body 370 is referred to as an inactive portion 415. That is, a portion, of the piezoelectric element 60, where the piezoelectric body 370 is interposed between the electrode 360 and the electrode 380 corresponds to the active portion 410, and a portion where the piezoelectric body 370 is not interposed between the electrode 360 and the electrode 380 is the inactive portion 415. Furthermore, when the piezoelectric element 60 is driven, a portion that is displaced in the direction along the Z axis is referred to as a flexible portion, and a portion that is not displaced in the direction along the Z axis is referred to as a non-flexible portion. That is, a portion that faces the pressure chamber 312 in the direction along the Z axis corresponds to a flexible portion, and a portion, of the piezoelectric element 60, that is outside the pressure chamber 312 corresponds to a non-flexible portion. Note that in the following description, the active portion 410 may be referred to as a proactive portion, and the inactive portion 415 may be referred to as a non-proactive portion.

One of the electrodes 360 and 380 located in the active portion 410 is configured as an independent individual electrode for each active portion 410, and the other of the electrodes 360 and 380 located in the active portion 410 is configured as a common electrode common to the plurality of active portions 410. Note that the following description will be made assuming that the electrode 360 is configured as an individual electrode and the electrode 380 is configured as a common electrode.

Specifically, the electrode 360 is configured as an independent individual electrode for each active portion 410, provided on the +Z side of the piezoelectric body 370 in the direction along the Z axis, and is cut into pieces corresponding to the respective pressure chambers 312. That is, the electrodes 360 are individually provided corresponding to the plurality of respective pressure chambers 312. At this time, the width of the electrode 360 in the direction along the Y axis is narrower than the width of the pressure chamber 312 in the direction along the Y axis. That is, in the direction along the Y axis, the end of the electrode 360 is located inside the region facing the pressure chamber 312.

Further, an end 360*a* of the electrode 360 on the +X side and an end 360*b* of the electrode 360 on the −X side are located outside the pressure chamber 312. For example, as shown in FIG. 11, in the first pressure chamber row, the end 360*a* of the electrode 360 is located on the +X side relative to a +X side end 312*a* of the pressure chamber 312, and the end 360*b* of the electrode 360 is located on the −X side relative to a −X side end 312*b* of the pressure chamber 312.

As shown in FIG. 9, the piezoelectric body 370 has a predetermined length in the direction along the X axis, and is provided continuously in the direction along the Y axis. That is, the piezoelectric body 370 is continuously provided, with a predetermined thickness, along the installation direction in which the pressure chambers 312 are installed together. Although the thickness of the piezoelectric body 370 is not particularly limited, but is about 1000 nanometers to 4000 nanometers, for example.

Further, as shown in FIG. 11, the length of the piezoelectric body 370 in the direction along the X axis is longer than the length of the pressure chamber 312 in the direction along the X axis, which is the longitudinal direction. Therefore, the piezoelectric body 370 is located so as to extend outside the pressure chamber 312 on both sides of the pressure chamber 312 in the direction along the X axis. Since the piezoelectric body 370 extends outside the pressure chamber 312 in the direction along the X axis, strength of the vibration plate 350 is improved, and the possibility that an anomaly such as cracks will occur in the vibration plate 350 and the piezoelectric element 60 when the active portion 410 is driven to displace the piezoelectric element 60 is reduced.

Further, as shown in FIG. 11, for example, a +X side end 370*a* of the piezoelectric body 370 corresponding to the first pressure chamber row is located on the +X side, which is outside the end 360*a* of the electrode 360. That is, the end 360*a* of the electrode 360 is covered by the piezoelectric body 370. On the other hand, a −X side end 370*b* of the piezoelectric body 370 corresponding to the first pressure chamber row is located on the +X side, which is inside the end 360*b* of the electrode 360. That is, the end 360*b* of the electrode 360 is not covered by the piezoelectric body 370.

Furthermore, as shown in FIGS. 9 and 12, the piezoelectric body 370 has a groove portion 371 that is a portion thinner in thickness, than other regions, corresponding to each partition wall 311. Here, as shown in FIG. 11, the piezoelectric body 370 at the groove portion 371 may be completely removed in the direction along the Z axis. That is, a state that the piezoelectric body 370 has a portion that is thinner in thickness than other regions includes a state where the piezoelectric body 370 is completely removed in the direction along the Z axis. Of course, the piezoelectric body 370 at the bottom face of the groove portion 371 may be thinner than the piezoelectric body 370 at other portions. Further, the length of the groove portion 371 in the direction along the Y axis, that is, the width of the groove portion 371 is equal to or larger than the width of the partition wall 311. The groove portion 371 has a rectangular shape in plan view from the −Z side. Note that the shape of the groove portion 371 in plan view from the −Z side is not limited to a rectangular shape, but may be a polygonal shape of pentagon or more, a circular shape, an elliptical shape, or the like.

When the piezoelectric body 370 has the groove portion 371, the rigidity of the arm portion of the vibration plate 350, which is a portion, of the vibration plate 350, that faces the end of the pressure chamber 312 in the direction along the Y axis, is suppressed. As a result, the piezoelectric element 60 can be displaced better.

As shown in FIGS. 9, 11, and 12, the electrode 380 is configured as a common electrode provided on a face, of the piezoelectric body 370, opposite to the electrode 360, that is, on the −Z side of the piezoelectric body 370, and common to the plurality of active portions 410. That is, the electrode 380 is provided in common for the plurality of pressure chambers 312. The electrode 380 has a predetermined length in the direction along the X axis, and is provided continuously in the direction along the Y axis. This electrode 380 is provided not only on the inner face of the groove 371, that is, on the side face of the groove portion 371 of the piezoelectric body 370, but also on the insulating film 352 that is the bottom face of the groove 371. Note that, for the inner face of the groove portion 371, the electrode 380 may be provided only on part of the inner face of the groove portion 371, and may not be provided on the entire inner face of the groove portion 371.

For example, in the first pressure chamber row, as shown in FIG. 11, a +X side end 380*a* of the electrode 380 is disposed on the +X side so as to be outside the end 360*a* of the electrode 360 covered by piezoelectric body 370. That is, the end 380*a* of the electrode 380 is located outside the end 312*a* of the pressure chamber 312, that is, on the +X side, and located outside the end 360*a* of the electrode 360, that is, on the +X side. The end 380*a* of the electrode 380 substantially matches the end 370*a* of the piezoelectric body 370 in the direction along the X axis. Therefore, the +X side end of the active portion 410, that is, the boundary between the active portion 410 and the inactive portion 415, is defined by the end 360*a* of the electrode 360.

On the other hand, while a −X side end 380*b* of the electrode 380 is disposed outside the end 312*b* of the pressure chamber 312, that is, on the −X side, the −X side end 380*b* of the electrode 380 is disposed inside the end 370*b* of the piezoelectric body 370, that is, on the +X side. As described above, the end 370*b* of the piezoelectric body 370 is located inside the end 360*b* of the electrode 360, that is, on the +X side. Therefore, the end 380*b* of the electrode 380 is located on the piezoelectric body 370 on the +X side relative to the end 360*b* of the electrode 360. Therefore, there is a portion where the surface of the piezoelectric body 370 is exposed on the −X side of the end 380*b* of the electrode 380.

In this way, the end 380*b* of the electrode 380 is located on the +X side relative to the end 370*b* of the piezoelectric body 370 and the end 360*b* of the electrode 360. Therefore, the −X side end of the active region 410, that is, the boundary between the active portion 410 and the inactive portion 415, is defined by the end 380*b* of the electrode 380.

Furthermore, a wiring portion 385 that is in the same layer as the electrode 380 but is electrically discontinuous with the electrode 380 is provided outside the end 380*b* of the electrode 380, that is, on the −X side of the end 380*b* of the electrode 380. Further, the wiring portion 385 is formed on the electrode 360 extending on the −X side relative to the piezoelectric body 370 from the piezoelectric body 370, with a distance provided so as not to contact the end 380*b* of the electrode 380. The wiring portion 385 is provided independently for each active portion 410. That is, the plurality of wiring portions 385 is disposed at predetermined intervals in the direction along the Y axis. Note that although the wiring portion 385 may be formed in a layer different from the electrode 380, it is preferably formed in the same layer as the electrode 380. As a result, the manufacturing process of the wiring portion 385 can be simplified and costs can be reduced.

Further, the individual lead electrode 391 is coupled to the electrode 360 of the piezoelectric element 60, and the common lead electrode 392, which is a common electrode for driving, is electrically coupled to the electrode 380 of the piezoelectric element 60. Further, the flexible wiring substrate 420 is electrically coupled to ends, of the individual lead electrodes 391 and the common lead electrode 392, opposite to ends coupled to the piezoelectric element 60. Further, wiring (not shown) that is electrically coupled to the control mechanism 10 and a plurality of circuits including the temperature information output circuit 26 is formed on the wiring substrate 420. Such a wiring substrate 420 is configured by, for example, a flexible printed circuit (FPC). Note that the wiring substrate 420 may be configured by any flexible substrate, and may be configured by, for example, a flexible flat cable (FFC) instead of the FPC.

Furthermore, the individual lead electrodes 391 and the common lead electrode 392 extend so as to be exposed from the through hole 332 formed in the protection substrate 330. Then, the individual lead electrodes 391 and the common lead electrode 392 are electrically coupled to the wiring substrate 420 inside the through hole 332. Moreover, the integrated circuit 421 on which the drive signal selection circuit 200 that outputs the drive signal VOUT for driving the piezoelectric element 60 is mounted is mounted on the wiring substrate 420.

Although the individual lead electrodes 391 and the common lead electrodes 392 are formed in the same layer, they are formed so as to be electrically discontinuous. As a result, the manufacturing process can be simplified and costs can be reduced, compared with a manufacturing process when the individual lead electrodes 391 and the common lead electrodes 392 are formed separately. Of course, the individual lead electrodes 391 and the common lead electrode 392 may be formed in different layers. Note that each of the individual lead electrodes 391 and the common lead electrode 392 may have an adhesion layer that improves adhesion to the electrodes 360 and 380 and the vibration plate 350.

The individual lead electrode 391 is provided for each active portion 410, that is, for each electrode 360. As shown in FIG. 11, for example, in the pressure chamber row, the individual lead electrode 391 is coupled to the vicinity of the end 360*b* of the electrode 360 provided outside the piezoelectric body 370 via the wiring portion 385, and pulled out on the −X side on the pressure chamber substrate 310, in fact, on the vibration plate 350.

On the other hand, as shown in FIG. 9, for example, in the first pressure chamber row, the common lead electrode 392 is pulled out on the −X side from on the electrode 380 constituting the common electrode on the piezoelectric body 370 to on the vibration plate 350 at both ends in the direction along the Y axis. Further, the common lead electrode 392 includes an extension portion 392*a* and an extension portion 392*b*. As shown in FIGS. 9 and 11, for example, in the first pressure chamber row, the extension portion 392*a* extends in the direction along the Y axis in a region corresponding to the end 312*a* of the pressure chamber 312, and the extension portion 392*b* extends in the direction along the Y axis in a region corresponding to the end 312*b* of the pressure chamber 312. These extension portions 392*a* and extension portions 392*b* are provided continuously in the direction along the Y axis with respect to the plurality of active portions 410.

Further, the extension portion 392*a* and the extension portion 392*b* extend from the inside of the pressure chamber 312 to the outside of the pressure chamber 312 in the direction along the X axis. In the present embodiment, the active portion 410 of the piezoelectric element 60 extends to the outside of the pressure chamber 312 at both ends of the pressure chamber 312 in the direction along the X axis, and the extension portion 392*a* and the extension portion 392*b* extends on the active portion 410 to the outside of the pressure chamber 312.

As shown in FIG. 11, the resistance wiring 401 is provided on the −Z side face of the vibration plate 350. The resistance wiring 401 is a configuration for detecting the temperature of the pressure chamber 312, and constitutes at least part of the temperature detection circuit 24 described above. The temperature detection circuit 24 of the present embodiment utilizes the characteristic that the electrical resistance value of metals, semiconductors, and the like changes depending on temperature. The material for the resistance wiring 401 may be any material whose electrical resistance value is temperature dependent, such as gold (Au), platinum (Pt), iridium (Ir), aluminum (Al), copper (Cu), titanium (Ti), tungsten (W), nickel (Ni), chromium (Cr), and the like. Among these, platinum (Pt) can be suitably employed as a material of the resistance wiring 401 from the viewpoint that the resistance value changes greatly depending on temperature and has high stability and precision. The resistance wiring 401 is stacked on the −Z side face of the vibration plate 350 so as to be electrically discontinuous with the electrode 360 in the same layer as the electrode 360.

As shown in FIG. 9, the resistance wiring 401 is a continuous wiring pattern stacked on the vibration plate 350, and one end of the resistance wiring 401 located on the +X side in the direction along the X axis is coupled to a measurement lead electrode 393*a*, and the other end of the resistance wiring 401 located on the −X side in the direction along the X axis is coupled to a measurement lead electrode 393*b*. Then, the measurement lead electrodes 393*a* and 393*b* are electrically coupled to the wiring substrate 420. As a result, the resistance wiring 401 is electrically coupled to the temperature information output circuit 26 via the wiring substrate 420. The temperature information output circuit 26 acquires the electrical resistance value of the resistance wiring 401 that changes according to the temperature of the pressure chamber 312, that is, a voltage across the resistance wiring 401 that changes according to the temperature of the pressure chamber 312, as a signal corresponding to the temperature of the pressure chamber 312.

Such resistance wiring 401 has a first pressure chamber row side meandering pattern that is on the +X side in the direction along the X axis, and a second pressure chamber row side meandering pattern that is on the −X side in the direction along the X axis. The first pressure chamber row side meandering pattern is provided so that at least a portion thereof overlaps with the supply communication passage 319 that communicates with each pressure chamber 312 constituting the first pressure chamber row when the ejection module 22 is viewed from the −Z side, and meanders along the Y axis. The second pressure chamber row side meandering pattern is provided so that at least a portion thereof overlaps with the supply communication passage 319 that communicates with each pressure chamber 312 constituting the second pressure chamber row when the ejection module 22 is viewed from the −Z side, and meanders along the Y axis. That is, the resistance wiring 401 included in the temperature detection circuit 24 has the first pressure chamber row side meandering pattern corresponding to the first pressure chamber row formed by the plurality of pressure chambers 312 and the second pressure chamber row side meandering pattern corresponding to the second pressure chamber row formed by the plurality of pressure chambers 312. Further, as shown in FIGS. 10 and 11, the distance between the −Z side end of the pressure chamber 312 and the resistance wiring 401 in the direction along the Z axis is shorter than the dimension of the pressure chamber 312 in the direction along the Z axis. Further, in the first pressure chamber row, the longest distance between the end 312*a* of the pressure chamber 312 and the resistance wiring 401 in the direction along the X axis is shorter than the dimension of the pressure chamber 312 in the direction along the X axis. As a result, the electrical resistance value of the resistance wiring 401 tends to change in response to a change in temperature of the pressure chamber 312.

The measurement lead electrodes 393 including the measurement lead electrode 393*a* and the measurement lead electrode 393*b* are formed in the same layer as and electrically discontinuous with the individual lead electrodes 391 and the common lead electrode 392. As a result, the manufacturing process can be simplified and costs can be reduced, compared with a manufacturing process when the measurement lead electrode 393 is formed separately from the individual lead electrode 391 and the common lead electrode 392.

The measurement lead electrode 393 extends so as to be exposed in the through hole 332 formed in the protection substrate 330 and is electrically coupled to the wiring substrate 420 in the through hole 332. As a result, the temperature information output circuit 26 can acquire the electrical resistance value of the resistance wiring 401, that is, a voltage value corresponding to the electrical resistance value, via the wiring substrate 420. Then, the temperature information output circuit 26 outputs the electrical resistance value of the resistance wiring 401 acquired according to the temperature acquisition request signal TD from the control circuit 100, that is, the temperature information signal TI corresponding to the temperature information tc based on a voltage value corresponding to the resistance value.

In the ejection module 22 configured as described above, since the resistance wiring 401 included in the temperature detection circuit 24 is provided in a layered manner on the vibration plate 350 located inside the ejection module 22, it is possible to dispose the resistance wiring 401 that is the temperature detection circuit 24 near the pressure chamber 312, and as a result, it is possible to reduce the deviation between the temperature detected based on the electrical resistance value of the resistance wiring 401 and the temperature of the pressure chamber 312. That is, the detection accuracy of the temperature of the pressure chamber 312 detected by the temperature detection circuit 24 is improved. As a result, the reliability of the information about the temperature of the pressure chamber 312 included in the temperature information signal TI output by the temperature information output circuit 26 is improved. Therefore, the accuracy of the control signal Ctrl-H corrected based on the temperature information signal TI is improved, and the accuracy of ejection control of the ejection module 22 according to the temperature of the ink stored in the pressure chamber 312 by the control circuit 100 is improved.

That is, the ejection module 22 included in the print head 20 of the present embodiment includes the piezoelectric element 60 including the electrode 360, the electrode 380, and the piezoelectric body 370, the piezoelectric body 370 being located between the electrode 360 and the electrode 380 in a direction along the Z axis that is the stacked direction in which the electrode 360, the electrode 380, and the piezoelectric body 370 are stacked, the piezoelectric element being driven by receiving the drive signal VOUT based on the drive signal COM, the vibration plate 350 located on the +Z side, of the piezoelectric element 60, that is one side in the direction along the Z axis that is the stacked direction and deformed by driving the piezoelectric element 60, the pressure chamber substrate 310 located on the +Z side, of the vibration plate 350, that is one side in the direction along the Z axis that is the stacked direction and provided with the plurality of pressure chambers 312 the volume of each of whom changes due to deformation of the vibration plate 350, the nozzle 321 that ejects the ink according to a change in volume of the pressure chambers 312, and the vibration resistance wiring 401 located on the −Z side, of the vibration plate 350, that is the other side in the direction along the Z axis that is the stacked direction and constitutes at least part of the temperature detection circuit 24 that detects the temperature of the pressure chamber 312.

As a result, the difference between the temperature detected based on the electrical resistance value of the resistance wiring 401 that is the temperature detection circuit 24 and the temperature inside the pressure chamber 312 can be reduced, and detection accuracy of the temperature of the pressure chamber 312 detected by the temperature detection circuit 24 is improved. As a result, the control circuit 100 can perform ejection control of the ejection module 22 in a manner appropriate to the temperature of the ink in the pressure chamber 312.

Furthermore, since at least a portion of the resistance wiring 401 that is the temperature detection circuit 24 is stacked on the vibration plate 350, the resistance wiring 401 that is the temperature detection circuit 24 can be disposed near the pressure chamber 312, so that the detection accuracy of the temperature of the pressure chamber 312 detected by the temperature detection circuit 24 is further improved. As a result, the control circuit 100 can ejection control of the ejection module 22 in a manner more appropriate to the temperature of the ink within the pressure chamber 312.

5. Configuration and Operation of Temperature Information Output Circuit

As described above, the liquid ejection apparatus 1 according to the present embodiment, the resistance wiring 401 included in the temperature detection circuit 24 that detects the temperature of the ejection module 22 is provided on the vibration plate 350, the resistance wiring 401 being disposed inside the ejection module 22 included in the print head 20. That is, the resistance wiring 401 included in the temperature detection circuit 24 is provided near the pressure chamber 312 in which the ink is stored. This reduces the difference in temperature between the temperature detected based on the change in the electrical resistance value of the resistance wiring 401 and the temperature inside the pressure chamber 312 and of the ink stored inside the pressure chamber 312, so that the detection accuracy of the temperature of the pressure chamber 312 detected by the temperature detection circuit 24, that is, the temperature of the ink stored in the pressure chamber 312 is improved.

On the other hand, since the resistance wiring 401 included in the temperature detection circuit 24 is provided near the pressure chamber 312 in which the ink is stored, the wiring through which the temperature detection signal TC including temperature information tc detected by the resistance wiring 401 propagates is located near the wiring through which the control signal Ctrl-H and the drive signal COM for driving the ejection module 22 propagate, and as a result, a new problem arises in that there is an increased possibility that noise caused by the control signal Ctrl-H and the drive signal COM may be superimposed on the temperature detection signal TC including the temperature information tc detected by the resistance wiring 401, and the detection accuracy of the temperature of the pressure chamber 312 detected by the temperature detection circuit 24 may decrease.

Further, the ejection module 22 applies pressure to the ink store in the pressure chamber 312 by changing the volume of the pressure chamber 312 by deformation or vibration of the vibration plate 350 caused by driving the piezoelectric element 60, and ejects the ink from the nozzle 321. Therefore, due to a change in pressure in the pressure chamber 312, the temperature of the ink stored in the pressure chamber 312 changes instantaneously. At this time, since the resistance wiring 401 included in the temperature detection circuit 24 is located near the pressure chamber 312, the temperature detection circuit 24 may detect a change in temperature caused by a change in pressure in the pressure chamber 312. When the resistance wiring 401 included in the temperature detection circuit 24 detects a change in temperature caused by a change in pressure in the pressure chamber 312, the temperature detection signal TC output by the temperature detection circuit 24 will be fluctuated due to slight difference in the timing of acquiring the temperature of the pressure chamber 312, and as a result, the reliability of the temperature detection signal TC output by the temperature detection circuit 24 and the temperature information signal TI based on the temperature detection signal TC may be reduced.

To solve this problem, in the liquid ejection apparatus 1 of the present embodiment, the temperature information output circuit 26 acquires a plurality of pieces of temperature information tc detected by the temperature detection circuit 24 at different timings, and outputs the temperature information signal TI based on the plurality of pieces of acquired temperature information tc. Then, the control circuit 100 corrects various signals including the drive signal COM based on the input temperature information signal TI. That is, the temperature information output circuit 26 outputs the temperature information signal TI according to the plurality of pieces of acquired temperature information tc, and the drive signal COM is corrected based on the temperature information signal TI output by the temperature information output circuit 26. This improves the reliability of the temperature information signal TI output by the temperature information output circuit 26, compared with the temperature information signal TI generated based on one piece of temperature information tc. That is, the acquisition accuracy of temperature in the ejection module 22 is improved. Therefore, the correction accuracy of the control signal Ctrl-H based on the temperature information signal TI in the control circuit 100 is improved, and the accuracy of the drive signal COM output by the drive circuit 50 based on the base drive signal dO included in the control signal Ctrl-H is improved. As a result, the ejection accuracy of the ink ejected from the ejection module 22 is improved.

In other words, in the liquid ejection apparatus 1 and the print head 20 of the present embodiment, the drive signal COM is corrected based on a plurality of pieces of temperature information tc corresponding to the temperature of the pressure chamber 312 detected by the temperature detection circuit 24 at different timings, so that the accuracy of the drive signal COM output by the drive circuit 50 is improved, and as a result, the ejection accuracy of the ink ejected from the ejection module 22 is improved.

Figure 13:
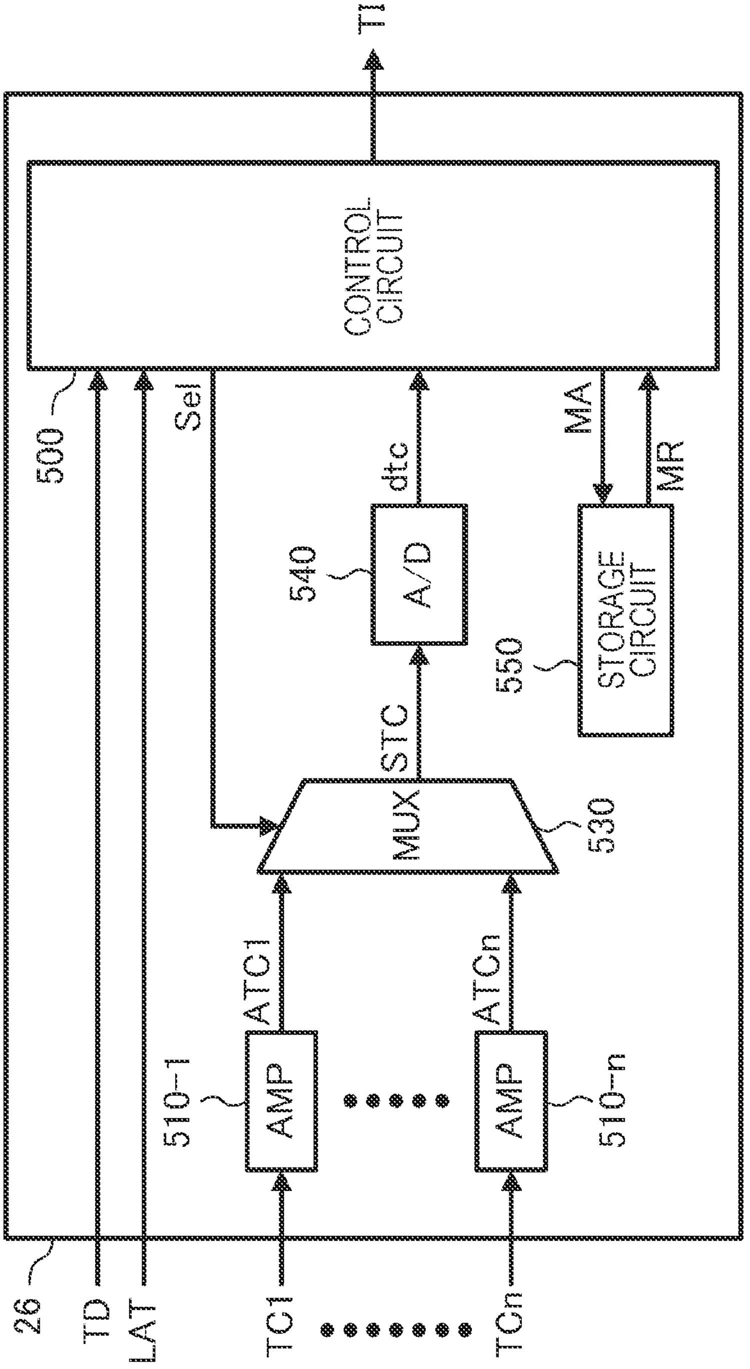
FIG. 13 is a diagram showing the functional configuration of a temperature information output circuit.

Here, the specific configuration and operation of the temperature information output circuit 26 that implements such operation will be described. FIG. 13 is a diagram showing the functional configuration of the temperature information output circuit 26. The temperature information output circuit 26 acquires the temperature information tc1 to tcn included in the temperature detection signals TC1 to TCn input from the ejection modules 22-1 to 22-*n*, respectively, based on the temperature acquisition request signal TD input from the control circuit 100, and generates the temperature information signal TI corresponding to the acquired temperature information tc1 to tcn to output the generated signal to the control circuit 100.

As shown in FIG. 13, the temperature information output circuit 26 includes a control circuit 500, amplifier circuits 510-1 to 510-*n*, a multiplexer 530, an AD conversion circuit 540, and a storage circuit 550.

The amplifier circuits 510-1 to 510-*n* receive the corresponding temperature detection signals TC1 to TCn, respectively. The amplifier circuits 510-1 to 510-*n* amplifies the input temperature detection signals TC1 to TCn to output the amplified signals as amplified detection signals ATC1 to ATCn, respectively.

Specifically, the temperature detection signal TC1 output from the ejection module 22-1 is input to the amplifier circuit 510-1. The amplifier circuit 510-1 amplifies the input temperature detection signal TC1 to output the amplified signal as the amplified detection signal ATC1. Furthermore, the temperature detection signal TCp output from the ejection module 22-*p* is input to the amplifier circuit 510-*p* (p is any one of 1 to n). The amplifier circuit 510-*p* amplifies the input temperature detection signal TCp to output the amplified signal as an amplified detection signal ATCp.

The amplified detection signals ATC1 to ATCn output from the amplifier circuits 510-1 to 510-*n*, respectively, are input to the multiplexer 530. Further, the multiplexer 530 receives a select signal Sel output from the control circuit 500. The multiplexer 530 selects any one of the amplified detection signals ATC1 to ATCn according to the input select signal Sel to output the selected signal as a selection temperature signal STC.

The AD conversion circuit 540 receives the selection temperature signal STC output from the multiplexer 530. The AD conversion circuit 540 acquires the input selection temperature signal STC at a predetermined sampling cycle, sequentially converts the acquired signal into a digital signal to output the converted digital signal to the control circuit 500. That is, the AD conversion circuit 540 acquires the temperature information tc included in the temperature detection signal TC selected by the multiplexer 530 from among the temperature detection signals TC1 to TCn input to the temperature information output circuit 26 at every predetermined sampling cycle and converts the acquired temperature information into the digital signal. Then, the AD conversion circuit 540 converts information corresponding to the acquired temperature information tc into the digital signal to output the converted digital signal to the control circuit 500. In other words, the AD conversion circuit 540 sequentially acquires information according to the temperature, of the ejection module 22, corresponding to the temperature detection signal TC selected by the multiplexer 530, and sequentially outputs the acquired digital signal according to the temperature to the control circuit 500. In the following description, the digital signal output by the AD conversion circuit 540 will be referred to as digital temperature information dtc.

The control circuit 500 receives the temperature acquisition request signal TD input to the temperature information output circuit 26, the latch signal LAT that defines the cycle tp, which is the ejection cycle of the ink from the ejection module 22, and the digital temperature information dtc output from the AD conversion circuit 540. The control circuit 500 controls the operations of various circuits of the temperature information output circuit 26 according to the input temperature acquisition request signal TD. As a result, the temperature information output circuit 26 generates and outputs the temperature information signal TI corresponding to the input temperature acquisition request signal TD.

Specifically, the control circuit 500 identifies the ejection module 22 whose temperature is to be acquired by analyzing the input temperature acquisition request signal TD. Then, the control circuit 500 outputs the select signal Sel for selecting the temperature detection signal TC corresponding to the ejection module 22 according to the analysis result of the temperature acquisition request signal TD at a timing defined by the latch signal LAT. As a result, the control circuit 500 sequentially receives the digital temperature information dtc corresponding to the temperature information tc included in the temperature detection signal TC corresponding to the ejection module 22 identified based on the temperature acquisition request signal TD according to the sampling cycle of the AD conversion circuit 540.

At this time, the control circuit 500 outputs a memory control signal MA for holding the input digital temperature information dtc in the storage circuit 550. As a result, the digital temperature information dtc that is sequentially input according to the sampling cycle of the AD conversion circuit 540 is held in the storage circuit 550 in order. Such a storage circuit 550 can include, for example, a register, a memory, and the like.

Furthermore, after the acquisition of the digital temperature information dtc is completed, the control circuit 500 outputs the memory control signal MA for reading out the digital temperature information dtc held in the storage circuit 550. As a result, the control circuit 500 receives a memory read signal MR including a plurality of pieces of digital temperature information dtc output by the AD conversion circuit 540 during a predetermined period. That is, the control circuit 500 acquires a plurality of pieces of digital temperature information dtc output by the AD conversion circuit 540 during the predetermined period. Then, the control circuit 500 generates and outputs the temperature information signal TI from the plurality of pieces of acquired digital temperature information dtc. That is, the control circuit 500 outputs the temperature information signal TI according to the temperature of the ejection module 22 identified corresponding to the analysis result of the temperature acquisition request signal TD.

Figure 14:
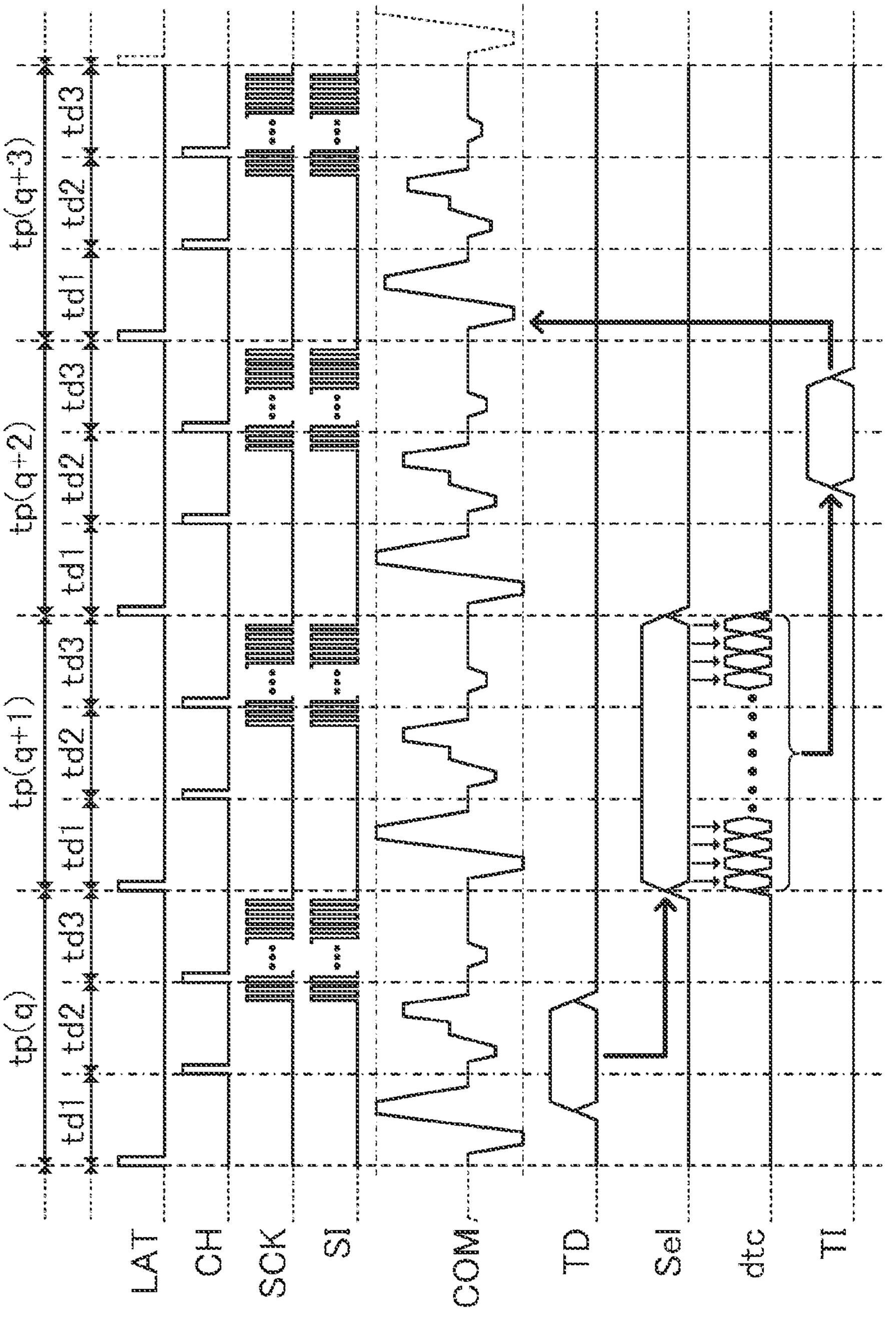
FIG. 14 is a diagram illustrating an example of timing at which temperature information tc is acquired by a temperature information output circuit.

A specific example of a method of acquiring the temperature information tc by the temperature information output circuit 26 configured as described above and a method of generating the temperature information signal TI based on the acquired temperature information tc will be described. FIG. 14 is a diagram showing an example of the acquisition timing of the temperature information tc by the temperature information output circuit 26.

As shown in FIG. 14, in a cycle tp(q), which is a cycle tp at an any timing, among a plurality of cycles tp included in the ejection cycle in which the ink is ejected from the ejection module 22, the temperature information output circuit 26 receives the temperature acquisition request signal TD. The control circuit 500 of the temperature information output circuit 26 analyzes the input temperature acquisition request signal TD to identify the ejection module 22 whose temperature requested by the temperature acquisition request signal TD is to be acquired.

After that, in the cycle tp(q+1) following the cycle tp(q) among the plurality of cycles tp included in the ejection cycle in which the ink is ejected from the ejection module 22, the control circuit 500 outputs the select signal Sel corresponding to the ejection module 22 whose temperature is to be acquired. As a result, the multiplexer 530 selects an amplified detection signal ATC obtained by amplifying the temperature detection signal TC corresponding to the ejection module 22 whose temperature is requested to be acquired. As a result, the amplified detection signal ATC corresponding to the ejection module 22 whose temperature has been requested to be acquired is input to the AD conversion circuit 540.

The AD conversion circuit 540 sequentially acquires the amplified detection signal ATC input in the cycle tp(q+1) based on a predetermined sampling cycle. That is, the AD conversion circuit 540 acquires the amplified detection signal ATC obtained by amplifying the temperature detection signal TC corresponding to the temperature of the ejection module 22 whose temperature has been requested to be acquired, that is, a plurality of pieces of information obtained by amplifying a plurality of pieces of temperature information tc included in the temperature detection signal TC corresponding to the temperature of the ejection module 22 whose temperature is requested to be acquired, at different timings according to a predetermined sampling cycle. As a result, the AD conversion circuit 540 sequentially outputs, to the control circuit 500, a plurality of pieces of digital temperature information dtc corresponding to a plurality of information obtained by amplifying the plurality of pieces of temperature information tc.

That is, the different timings at which the temperature information output circuit 26 acquires the digital temperature information dtc based on the temperature information tc detected by the temperature detection circuit 24 are included in the cycle tp(q+1) that is a period during which the ejection module 22 receives the drive signal COM and ejects the ink, that is, a period from when the latch signal LAT is input to the ejection module 22 to when the latch signal LAT is input next.

Then, in the cycle tp(q+2) following the cycle tp(q+1) of the cycle tp that is an ejection cycle of the ink from the ejection module 22, the control circuit 500 generates the temperature information signal TI based on the plurality of pieces of digital temperature information dtc to output the generated signal to the control circuit 100. That is, the control circuit 500 generates the temperature information signal TI based on a plurality of pieces of digital temperature information dtc corresponding to the temperature of the ejection module 22 designated based on the temperature acquisition request signal TD to output the generated signal to the control circuit 100.

After that, the control circuit 100 calculates a correction value of the control signal Ctrl-H based on the input temperature information signal TI, and outputs the control signal Ctrl-H corrected based on the calculated correction value in the cycle tp(q+3) following the cycle tp(q+2) of the cycle tp that is an ejection cycle of the ink from the ejection module 22. As a result, the drive circuit 50 outputs the drive signal COM corrected based on the temperature information signal TI in the cycle tp(q+3).

As described above, in the liquid ejection apparatus 1 and the print head 20 of the present embodiment, the corrected drive signal COM input to the print head 20 is corrected based on a plurality of pieces of temperature information tc corresponding to the temperature of the pressure chamber 312 detected by the resistance wiring 401 included in the temperature detection circuit 24 at different timings.

Specifically, the print head 20 receives the latch signal LAT that defines the cycle tp, which is the ejection cycle of the ink from the ejection module 22. The temperature information output circuit 26 of the ejection module 22 sequentially acquires information corresponding to the temperature information tc detected by the resistance wiring 401 included in the temperature detection circuit 24 at different timings based on the sampling cycle in a cycle tp(q+1) in which the ejection module 22 receives the drive signal COM and ejects the ink, that is, a cycle tp(q+1) of a plurality of cycles tp from when the latch signal LAT is input to when the latch signal LAT is input next.

Thereafter, the temperature information output circuit 26 outputs to the control circuit 100 the temperature information signal TI corresponding to the plurality of pieces of temperature information tc acquired in the cycle tp(q+1). As a result, the drive signal COM input to the ejection module 22 is corrected based on the temperature information signal TI.

Next, an example of a method of acquiring the digital temperature information dtc according to the temperature information tc included in the temperature detection signal TC by the temperature information output circuit 26 and generating the temperature information signal TI based on the acquired digital temperature information dtc will be described.

Figure 15:
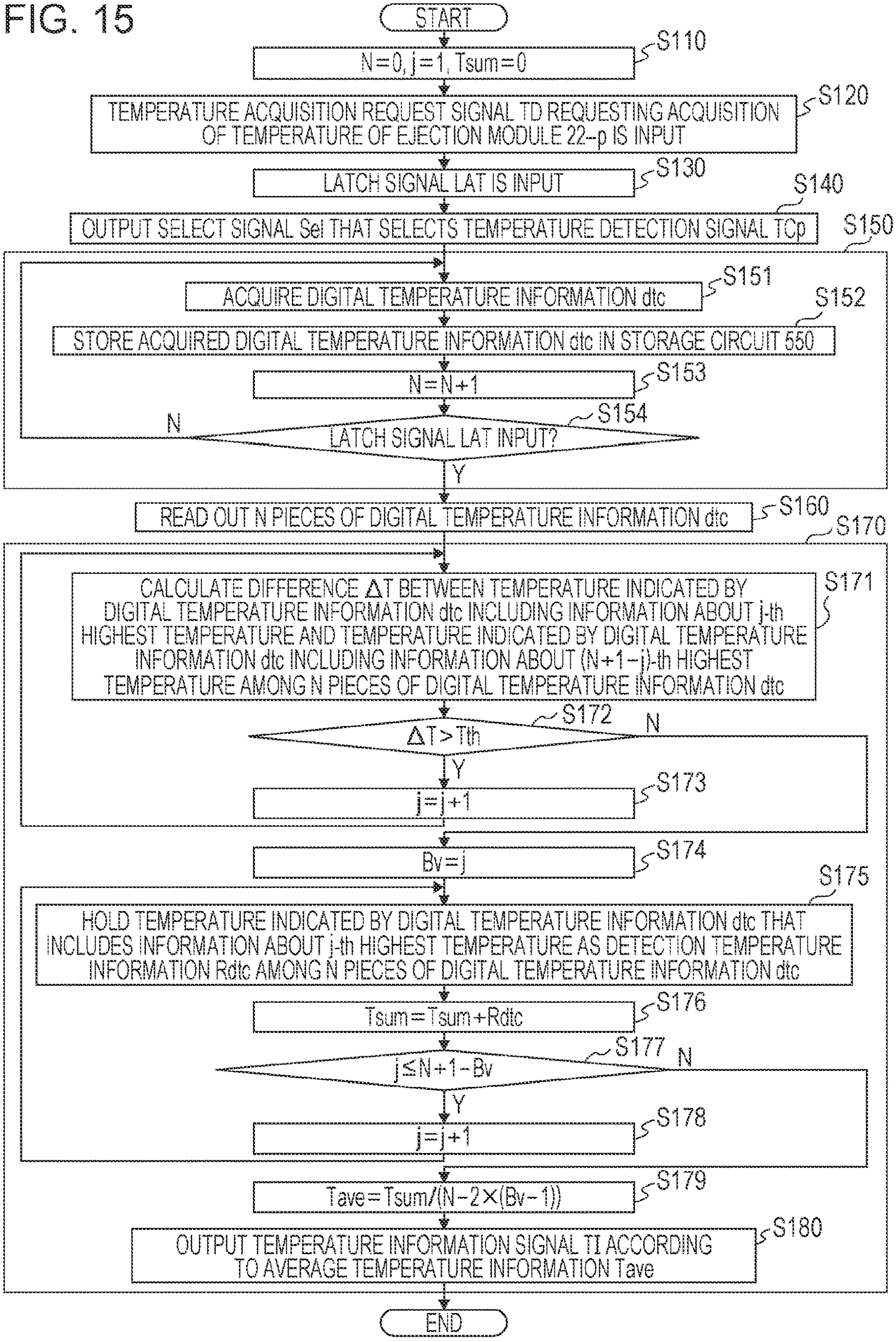
FIG. 15 is a diagram illustrating an example of a method of generating a temperature information signal TI by a temperature information output circuit.

FIG. 15 is a diagram illustrating an example of a method of generating the temperature information signal TI by the temperature information output circuit 26.

As shown in FIG. 15, when the temperature information output circuit 26 generates the temperature information signal TI, the temperature information output circuit 26 initializes a temperature acquisition count N, a variable j, and a total value Tsum. Specifically, the control circuit 500 included in the temperature information output circuit 26 initializes the temperature acquisition count N to "0", initializes the variable j to "1", and initializes the total value Tsum to "0" (step S110). Thereafter, the temperature acquisition request signal TD requesting acquisition of the temperature of the ejection module 22-*p* is input to the temperature information output circuit 26 (step S120). The control circuit 500 identifies the ejection module 22-*p* whose temperature is to be acquired by analyzing the input temperature acquisition request signal TD.

Thereafter, since the latch signal LAT is input to the temperature information output circuit 26 (step S130), the control circuit 500 outputs the select signal Sel to select the temperature detection signal TCp corresponding to the ejection module 22-*p* identified according to the analysis result of the temperature acquisition request signal TD (step S140). As a result, the multiplexer 530 included in the temperature information output circuit 26 selects the amplified detection signal ATCp obtained by amplifying the temperature detection signal TCp by the amplifier circuit 510-*p* to output the selected signal to the AD conversion circuit 540.

After the multiplexer 530 outputs the selected amplified detection signal ATCp to the AD conversion circuit 540, the temperature information output circuit 26 performs a temperature information acquisition process (step S150) of acquiring the digital temperature information dtc output from the AD conversion circuit 540 at each predetermined sampling cycle to storing the acquired information in the storage circuit 550.

Specifically, in the temperature information acquisition process (step S150), the AD conversion circuit 540 converts the amplified detection signal ATCp input from the multiplexer 530 into the digital temperature information dtc to output the converted information to the control circuit 500. The control circuit 500 acquires the digital temperature information dtc output from the AD conversion circuit 540 (step S151), stores the acquired digital temperature information dtc in the storage circuit 550 (step S152), and adds "1" to the temperature acquisition count N (step S153). After that, the control circuit 500 determines whether the latch signal LAT is input to the temperature information output circuit 26 (step S154). When the latch signal LAT is not input to the temperature information output circuit 26 (N in step S154), the control circuit 500 repeatedly executes the processes in steps S151 to S153 described above. Then, when the latch signal LAT is input to the temperature information output circuit 26 (Y in step S154), the control circuit 500 ends the temperature information acquisition process (step S150).

In other words, the temperature information output circuit 26 acquires the N pieces of digital temperature information dtc corresponding to the N pieces of temperature information tcp included in the temperature detection signal TCp in a cycle tp from when the latch signal LAT is input to when the latch signal LAT is input next and sequentially stores the acquired information in the storage circuit 550.

After the temperature information acquisition process (step S150) is completed, the control circuit 500 reads out the digital temperature information dtc included in the storage circuit 550, specifically, the N pieces of digital temperature information dtc acquired in the temperature information acquisition process (step S150) (step S160). Then, the control circuit 500 executes a temperature information output process (step S170) of calculating and outputting the temperature information signal TI based on the N pieces of digital temperature information dtc that have been read out.

In the temperature information output process (step S170), the temperature information output circuit 26 of the present embodiment excludes some pieces of the digital temperature information dtc with a large variation among the N pieces of read digital temperature information dtc, and generates the temperature information signal TI by calculating the average of the remaining digital temperature information dtc. That is, the temperature information output circuit 26 calculates the adjusted average of the N pieces of digital temperature information dtc to output the average as the temperature information signal TI.

Specifically, in the temperature information output process (step S170), the control circuit 500 calculates a difference ΔT between, among the N pieces of digital temperature information dtc read from the storage circuit 550, a temperature indicated by the digital temperature information dtc including information about the j-th highest temperature and a temperature indicated by the digital temperature information dtc including information about the (N+1−j)-th highest temperature (step S171). At this time, since the variable j is "1", the control circuit 500 calculates a difference ΔT between, among the N pieces of digital temperature information dtc read from the storage circuit 550, a temperature indicated by the digital temperature information dtc including information about the highest temperature and a temperature indicated by the digital temperature information dtc including information about the N-th highest temperature. In other words, when the variable j is "1", the control circuit 500 calculates a difference ΔT between, among the N pieces of digital temperature information dtc read from the storage circuit 550, a temperature indicated by the digital temperature information dtc including information about the highest temperature and a temperature indicated by the digital temperature information dtc including information about the lowest temperature. Then, the control circuit 500 determines whether the calculated difference ΔT is larger than a predetermined threshold value Tth (step S172).

When the calculated difference ΔT is larger than the predetermined threshold value Tth (Y in step S172), the control circuit 500 adds "1" to the variable j (step S173), and executes the above-described steps S171 and S172. That is, since the variable j is "2", the control circuit 500 calculates again a difference ΔT again between, among the N pieces of digital temperature information dtc read from the storage circuit 550, a temperature indicated by the digital temperature information dtc including information about the second highest temperature and a temperature indicated by the digital temperature information dtc including information about the (N−1)-th highest temperature (step S171). In other words, when the variable j is "2", the control circuit 500 calculates a difference ΔT between, among the N pieces of digital temperature information dtc read from the storage circuit 550, a temperature indicated by the digital temperature information dtc including information about the second highest temperature and a temperature indicated by the digital temperature information dtc including information about the second lowest temperature. Then, the control circuit 500 determines whether the calculated difference ΔT is larger than a predetermined threshold value Tth (step S172).

That is, the control circuit 500 successively adds the variable j until a difference ΔT between, among the N pieces of digital temperature information dtc read from the storage circuit 550, a temperature indicated by the digital temperature information dtc including information about the j-th highest temperature and a temperature indicated by the digital temperature information dtc including information about the (N+1−j)-th highest temperature is equal to or less than the predetermined threshold value Tth. In other words, the control circuit 500 searches for a boundary where a difference ΔT between, among the N pieces of digital temperature information dtc read from the storage circuit 550, a temperature indicated by the digital temperature information dtc including information about the j-th highest temperature and a temperature indicated by the digital temperature information dtc including information about the j-th lowest temperature is smaller than the predetermined threshold value Tth. Then, when the calculated difference ΔT is equal to or less than the predetermined threshold value Tth (N in step S172), the control circuit 500 holds the variable j at this time as a boundary value By (step S174).

After holding the variable j as the boundary value Bv, the control circuit 500 holds the temperature indicated by the digital temperature information dtc including information about the j-th highest temperature among the N pieces of digital temperature information dtc as a detection temperature information Rdtc (step S175), adds the detection temperature information Rdtc to the total value Tsum, and hold the result as the new total value Tsum (step S176). Then, the control circuit 500 determines whether the variable j is equal to or less than a value obtained by subtracting the boundary value By from a value obtained by adding "1" to the temperature acquisition count N (step S177). Then, when the variable j is equal to or less than the value obtained by subtracting the boundary value By from the value obtained by adding "1" to the temperature acquisition count N (Y in step S177), the control circuit 500 adds "1" to the variable j, holds the temperature indicated by the digital temperature information dtc, among the N pieces of digital temperature information dtc, including information about the j-th highest temperature as the detection temperature information Rdtc using the variable j after the addition (step S175), adds the detection temperature information Rdtc to the total value Tsum, and holds the result as the new total value Tsum (step S176).

That is, the control circuit 500 adds the temperatures indicated by the digital temperature information dtc from the digital temperature information dtc including information about the Bv-th highest temperature to the digital temperature information dtc including information about the (N+1−Bv)-th highest temperature, and hold the added temperatures as the total value Tsum. In other words, the control circuit 500 calculates, among the N pieces of digital temperature information dtc, the sum of N−2×(Bv−1) pieces of digital temperature information dtc indicating a temperature that is lower than a temperature indicated by the digital temperature information dtc including information about the Bv-th highest temperature and that is higher than a temperature indicated by the digital temperature information dtc including information about the Bv-th lowest temperature, and holds the calculated sum as the total value Tsum.

Then, when the variable j exceeds the value obtained by subtracting the boundary value By from the value obtained by adding "1" to the temperature acquisition count N (N in step S177), the control circuit 500 calculates average temperature information Tave obtained by dividing the calculated total value Tsum by "N−2×(Bv−1)", which is the number of digital temperature information dtc added in calculating the total value Tsum (step S179). That is, the control circuit 500 calculates, among the N pieces of digital temperature information dtc, the average value of the temperatures indicated by N−2×(Bv−1) pieces of digital temperature information dtc from the digital temperature information dtc including information about the Bv-th highest temperature to the digital temperature information dtc including information about the (N+1−Bv)-th highest temperature, and acquires the calculated average value as the average temperature information Tave. In other words, the control circuit 500 calculates, among the N pieces of digital temperature information dtc, the arithmetic mean of N−2×(Bv−1) pieces of digital temperature information dtc indicating a temperature between a temperature indicated by the digital temperature information dtc including information about the Bv-th highest temperature and a temperature indicated by the digital temperature information dtc including information about the Bv-th lowest temperature, and acquires the calculated arithmetic mean as the average temperature information Tave.

Then, the control circuit 500 generates the temperature information signal TI including the acquired average temperature information Tave. Then, the temperature information output circuit 26 outputs the temperature information signal TI corresponding to the calculated average temperature information Tave (step S180). In other words, the control circuit 500 outputs to the control circuit 100 the temperature information signal TI including the average temperature information Tave calculated based on the temperature information tcp indicating the temperature of the ejection module 22-*p*. This completes the temperature information signal output process (step S170) by the temperature information output circuit 26 and the generation of the temperature information signal TI by the temperature information output circuit 26.

As described above, when a difference ΔT between, among the N pieces of digital temperature information dtc, the j-th highest temperature defined by the digital temperature information dtc with respect to a temperature of the pressure chamber 312 defined by the digital temperature information dtc and the (N+1-j)-th highest temperature defined by the digital temperature information dtc with respect to a temperature of the pressure chamber 312 defined by the digital temperature information dtc is larger than a predetermined threshold value Tth, and a difference ΔT between, among the N pieces of digital temperature information dtc, the (j+1)-th highest temperature defined by the digital temperature information dtc with respect to a temperature of the pressure chamber 312 defined by the digital temperature information dtc and the (N-j)-th highest temperature defined by the digital temperature information dtc with respect to a temperature of the pressure chamber 312 defined by the digital temperature information dtc is equal to or less than the predetermined threshold value Tth, the temperature information output circuit 26 of the present embodiment calculates the arithmetic mean of N−2×j pieces of digital temperature information dtc in which, among the N digital temperature information dtc, a temperature of the pressure chamber 312 defined by the digital temperature information dtc is lower than the j-th highest temperature defined by the digital temperature information dtc and a temperature of the pressure chamber 312 defined by the digital temperature information dtc is higher than the (N+1−j)-th highest temperature defined by the digital temperature information dtc to output the calculated arithmetic mean as the temperature information signal TI.

Here, the drive circuit 50 is an example of a drive signal output circuit, and the drive signal COM output by the drive circuit 50 is an example of a drive signal. Further, in view of the fact that the drive signal VOUT supplied to the piezoelectric element 60 is generated according to the signal waveform included in the drive signal COM, the drive signal VOUT is also an example of a drive signal. Further, the control circuit 100 that corrects and outputs the base drive signal dO that is the basis of the drive signal COM based on the temperature information signal TI is an example of a correction unit, the latch signal LAT that is output by the control circuit 100 and defines the ejection cycle of the ink from the ejection module 22 and the print head 20 is an example of an ejection cycle defining signal, the plurality of cycles tp defined by the latch signal LAT is an example of ejection cycles, and, among the plurality of cycles tp, the cycle tp (q+1) is an example of an ejection period and a period during which a liquid is ejected. Further, the electrode 360 included in the ejection module 22 is an example of a first electrode, the electrode 380 included in the ejection module 22 is an example of a second electrode, and at least one of the resistance wiring 401 and the temperature detection circuits 24 including the resistance wiring 401 that are included in the ejection module 22 is an example of a temperature detection unit.

At least one of the temperature information tc included in the temperature detection signal TC output by the temperature detection circuit 24 and the digital temperature information dtc obtained by amplifying the temperature information tc and converting the amplified information into a digital signal is an example of temperature information, at least one of the plurality of pieces of temperature information tc and the plurality of pieces of digital temperature information dtc acquired by the temperature information output circuit 26 in the cycle tp(q+1) is an example of N pieces of temperature information, the plurality of pieces of temperature information tc acquired by the temperature information output circuit 26 in the cycle tp (q+1), the temperature information tc among and the plurality of pieces of digital temperature information dtc, the temperature information tc in which a temperature indicated by the digital temperature information dtc is (Bv−1)-th highest, and the digital temperature information dtc are an example of i-th temperature information, the temperature information tc, the temperature information tc in which a temperature indicated by the digital temperature information dtc is Bv-th highest, and the digital temperature information dtc are an example of (i+1)-th temperature information, the temperature information tc, the temperature information tc in which a temperature indicated by the digital temperature information dtc is (Bv−1)-th lowest, and the digital temperature information dtc are an example of (N+1−i)-th temperature information, and the temperature information tc, the temperature information tc in which a temperature indicated by the digital temperature information dtc is Bv-th lowest, and the digital temperature information dtc are an example of (N−i)-th temperature information.

6. Functions and Effects

As described above, in the liquid ejection apparatus 1 and the print head 20 of the present embodiment, the ejection module 22 includes the piezoelectric element 60 including the electrode 360, the electrode 380, and the piezoelectric body 370, the piezoelectric body 370 being located between the electrode 360 and the electrode 380 in a direction along the Z axis that is the stacked direction in which the electrode 360, the electrode 380, and the piezoelectric body 370 are stacked, the piezoelectric element being driven by receiving the drive signal VOUT based on the drive signal COM, the vibration plate 350 located on one side of the piezoelectric element 60 in the stacked direction and deformed by driving the piezoelectric element 60, the pressure chamber substrate 310 located on one side of the vibration plate 350 in the stacked direction and provided with the pressure chamber 312 whose volume changes due to deformation of the vibration plate 350, the nozzle 321 that ejects the ink according to a change in volume of the pressure chambers 312, and the temperature detection circuit 24 including the resistance wiring 401 located on the other side of the vibration plate 350 in the stacked direction and detecting the temperature of the pressure chamber 312. That is, in the ejection module 22 of the present embodiment, the temperature detection circuit 24 that detects the temperature of the ink stored in the pressure chamber 312 is disposed near the pressure chamber 312. This improves the accuracy with which the temperature detection circuit 24 detects the temperature of the ink stored in the pressure chamber 312.

Furthermore, in the liquid ejection apparatus 1 and the print head 20 of the present embodiment, the drive signals COM and VOUT that cause the ejection module 22 to eject the ink from the nozzle are corrected based on the N pieces of temperature information tc and the N pieces of digital temperature information dtc (N is a natural number of 2 or more) corresponding to the temperature of the pressure chamber 312 detected by the temperature detection circuit 24 at different timings. This reduces the influence of noise superimposed on the temperature information tc and digital temperature information dtc, compared with the case where the temperature of the pressure chamber 312 is calculated based on one temperature information tc and one digital temperature information dtc. As a result, the correction accuracy of the drive signals COM and VOUT corrected based on the temperature information tc and the digital temperature information dtc is improved, and the ejection accuracy of the ink ejected from the ejection module 22 is improved.

Furthermore, in the liquid ejection apparatus 1 and the print head 20 of the present embodiment, since the influence of noise superimposed on the temperature information tc and the digital temperature information dtc is reduced, even when the drive signals COM and VOUT are corrected using temperature information tc and digital temperature information dtc acquired in a period in which the print head 20 receives the drive signal COM and the ink is ejected, for example, a period based on the cycle tp from when the latch signal LAT is input to when the latch signal LAT is input next, the possibility that the correction accuracy of the corrected drive signals COM and VOUT may decrease is reduced, and as a result, the ejection accuracy of the ink ejected from the ejection module 22 is improved.

Further, in the liquid ejection apparatus 1 and the print head 20 of the present embodiment, the temperature information output circuit 26 calculates the adjusted average of the N pieces of temperature information tc and the N pieces of digital temperature information dtc, and the drive circuit 50 outputs the drive signal COM corrected based on the temperature information signal TI according to the calculation result. Specifically, when a difference ΔT between, among the N pieces of digital temperature information dtc, the j-th highest temperature defined by the digital temperature information dtc with respect to a temperature of the pressure chamber 312 defined by the digital temperature information dtc and the (N+1−j)-th highest temperature defined by the digital temperature information dtc with respect to a temperature of the pressure chamber 312 defined by the digital temperature information dtc is larger than a predetermined threshold value Tth, and a difference ΔT between, among the N pieces of digital temperature information dtc, the (j+1)-th highest temperature defined by the digital temperature information dtc with respect to a temperature of the pressure chamber 312 defined by the digital temperature information dtc and the (N−j)-th highest temperature defined by the digital temperature information dtc with respect to a temperature of the pressure chamber 312 defined by the digital temperature information dtc is equal to or less than the predetermined threshold value Tth, the temperature information output circuit 26 calculates the arithmetic mean of N−2×j pieces of digital temperature information dtc in which, among the N digital temperature information dtc, a temperature of the pressure chamber 312 defined by the digital temperature information dtc is lower than the j-th highest temperature defined by the digital temperature information dtc and a temperature of the pressure chamber 312 defined by the digital temperature information dtc is higher than the (N+1−j)-th highest temperature defined by the digital temperature information dtc to output the calculated arithmetic mean as the temperature information signal TI.

This makes it possible to eliminate an abnormal value due to the influence of noise included in the N pieces of digital temperature information dtc, and further reduces the influence of noise superimposed on the temperature information tc and the digital temperature information dtc. As a result, the correction accuracy of the drive signals COM and VOUT corrected based on the temperature information tc and the digital temperature information dtc is further improved, and the ejection accuracy of the ink ejected from the ejection module 22 is further improved.

7. Modification

In the liquid ejection apparatus 1 and the print head 20 of the present embodiment described above, although the explanation has been made assuming that the temperature information output circuit 26 calculates the adjusted average of the N pieces of temperature information tc and the N pieces of digital temperature information dtc, and the drive circuit 50 outputs the drive signal COM corrected based on the temperature information signal TI according to the calculation result, the temperature information output circuit 26 may use an arithmetic mean obtained by adding all the N pieces of temperature information tc and the N pieces of digital temperature information dtc and dividing the added value by N. That is, the temperature information output circuit 26 may calculate the arithmetic mean of the N pieces of temperature information tc and the N pieces of digital temperature information dtc to output the calculated arithmetic mean as the temperature information signal TI. As a result, the influence of noise superimposed on the temperature information tc and the digital temperature information dtc can be reduced by simple calculation, and in addition to the above-mentioned functions and effects, the calculation load on the temperature information output circuit 26 can be reduced.

Although the embodiments and the modification have been described above, the present disclosure is not limited to the embodiments and the modifications, and can be implemented in various modes without departing from the gist of the disclosure. For example, it is also possible to combine the above embodiments as appropriate.

The disclosure includes a configuration substantially same as the configuration described in the embodiments (for example, a configuration having the same function, method, and result, or a configuration having the same object and effect). Further, the disclosure includes a configuration in which a non-essential part of the configuration described in the embodiments is replaced. Further, the disclosure includes a configuration having the same functions and effects as the configuration described in the embodiments or a configuration capable of achieving the same object. The disclosure also includes a configuration in which a known technique is added to the configuration described in the embodiments.

The following content is derived from the embodiments described above.

An aspect of a print head includes an ejection module that ejects a liquid by receiving a corrected drive signal, wherein the ejection module includes a piezoelectric element including a first electrode, a second electrode, and a piezoelectric body, the piezoelectric body being located between the first electrode and the second electrode in a stacked direction in which the first electrode, the second electrode, and the piezoelectric body are stacked, the piezoelectric element being driven by receiving the drive signal, a vibration plate located on one side of the piezoelectric element in the stacked direction and deformed by driving the piezoelectric element, a pressure chamber substrate located on one side of the vibration plate in the stacked direction and provided with a pressure chamber whose volume changes due to deformation of the vibration plate, a nozzle that ejects a liquid according to a change in volume of the pressure chamber, and a temperature detection unit that is located on the other side of the vibration plate in the stacked direction and detects a temperature of the pressure chamber, wherein the drive signal is corrected based on N pieces of temperature information, where N is a natural number of 2 or more, corresponding to the temperature of the pressure chamber detected by the temperature detection unit at different timings.

According to the print head, the temperature detection unit that detects the temperature of the pressure chamber is located inside the ejection module and on the other side of the vibration plate in the stacked direction, so that the temperature detection unit can be disposed near the pressure chamber located on one side the vibration plate in the stacked direction. This improves the accuracy with which the temperature detection unit detects the temperature of the pressure chamber.

In addition, according to the print head, the drive signal for ejecting a liquid from the ejection module is corrected based on the N pieces of temperature information (N is a natural number of 2 or more) corresponding to the temperature of the pressure chamber detected by the temperature detection unit at different timings. As a result, even when noise is superimposed on the temperature information corresponding to the temperature of the pressure chamber detected by the temperature detection unit, the influence of the noise is reduced, and as a result, the correction accuracy of the drive signal corrected according to the temperature of the pressure chamber is improved. Therefore, the ejection accuracy of the ink ejected from the ejection module based on the corrected drive signal is improved.

In an aspect of the print head, an ejection cycle defining signal that defines an ejection cycle of a liquid from the ejection module mat be input, and the different timings may be included in an ejection period from when the ejection cycle defining signal is input to when the ejection cycle defining signal is input next.

According to the print head, even when noise is superimposed on the temperature information corresponding to the temperature of the pressure chamber detected by the temperature detection unit, the influence of the noise is reduced. Therefore, even when the temperature information used to correct the drive signal is acquired in the ejection period from when the ejection cycle defining signal is input to when the ejection cycle defining signal is input next, the possibility that the correction accuracy of the drive signal corrected according to the temperature of the pressure chamber will decrease is reduced, and as a result, the ejection accuracy of the ink ejected from the ejection module based on the corrected drive signal is improved.

In one embodiment of the print head, the print head may further include a temperature information output circuit that outputs a temperature information signal indicating a temperature of the ejection module, wherein the temperature information output circuit may output the temperature information signal corresponding to the N pieces of temperature information acquired in the ejection period, and wherein the drive signal may be corrected based on the temperature information signal.

In an aspect of the print head, the temperature information output circuit may calculate an arithmetic mean of the N pieces of temperature information to output the calculated arithmetic mean as the temperature information signal.

According to the print head, by calculating the arithmetic mean of the N pieces of temperature information, even when noise is superimposed on any of the N pieces of temperature information corresponding to the temperature of the pressure chamber detected by the temperature detection unit, the influence of the noise is reduced. As a result, the correction accuracy of the drive signal corrected according to the temperature of the pressure chamber is improved. Therefore, the ejection accuracy of the ink ejected from the ejection module based on the corrected drive signal is improved.

In an aspect of the print head, the temperature information output circuit may calculate an adjusted average of the N pieces of temperature information to output the adjusted average as the temperature information signal.

According to the print head, by calculating the adjusted average of the N pieces of temperature information, even when any of the N pieces of temperature information corresponding to the temperature of the pressure chamber detected by the temperature detection unit includes an abnormal value due to the influence of noise, the influence of the abnormal value is reduced. As a result, the correction accuracy of the drive signal corrected according to the temperature of the pressure chamber is improved. Therefore, the ejection accuracy of the ink ejected from the ejection module based on the corrected drive signal is improved.

In an aspect of the print head, when a difference between, among the N pieces of temperature information, i-th temperature information in which a temperature of the pressure chamber is i-th highest, where i is any natural number from 1 to N/2, and (N+1−i)-th temperature information in which a temperature of the pressure chamber is (N+1−i)-th highest is larger than a predetermined threshold value, and a difference between, among the N pieces of temperature information, (i+1)-th temperature information in which a temperature of the pressure chamber is (i+1)-th highest and (N−i)-th temperature information in which a temperature of the pressure chamber is (N−i)-th highest is equal to or less than the predetermined threshold value, the temperature information output circuit may calculate an arithmetic mean of N−2×i pieces of temperature information in which, among the N pieces of temperature information, a temperature of the pressure chamber is lower than the i-th temperature information, and a temperature of the pressure chamber is higher than the (N+1−i)-th temperature information to output the arithmetic mean as the temperature information signal.

In an aspect of the print head, the different timings may be included in a period during which the ejection module receives the drive signal and ejects a liquid.

According to the print head, even when noise is superimposed on the temperature information corresponding to the temperature of the pressure chamber detected by the temperature detection unit, the influence of the noise is reduced. Therefore, even when the temperature information used to correct the drive signal is input in the period when the ejection module ejects a liquid, the possibility that the correction accuracy of the drive signal corrected according to the temperature of the pressure chamber is reduced, and as a result, the ejection accuracy of the ink ejected from the ejection module based on the corrected drive signal is improved.

An aspect of a liquid ejection apparatus includes a drive signal output circuit that outputs a corrected drive signal, a correction unit that corrects the drive signal, and a print head that receives the drive signal and ejects a liquid, wherein the print head includes an ejection module that receives the drive signal and ejects a liquid, wherein the ejection module includes a piezoelectric element including a first electrode, a second electrode, and a piezoelectric body, the piezoelectric body being located between the first electrode and the second electrode in a stacked direction in which the first electrode, the second electrode, and the piezoelectric body are stacked, the piezoelectric element being driven by receiving the drive signal, a vibration plate located on one side of the piezoelectric element in the stacked direction and deformed by driving the piezoelectric element, a pressure chamber substrate located on one side of the vibration plate in the stacked direction and provided with a pressure chamber whose volume changes due to deformation of the vibration plate, a nozzle that ejects a liquid according to a change in volume of the pressure chamber, and a temperature detection unit that is located on the other side of the vibration plate in the stacked direction and detects a temperature of the pressure chamber, and wherein the correction unit corrects the drive signal based on N pieces of temperature information, where N is a natural number of 2 or more, corresponding to the temperature of the pressure chamber detected by the temperature detection unit at different timings.

According to the liquid ejection apparatus, the temperature detection unit that detects the temperature of the pressure chamber of the print head is located inside the ejection module and on the other side of the vibration plate in the stacked direction, so that the temperature detection unit can be disposed near the pressure chamber located on one side of the vibration plate in the stacked direction. This improves the accuracy with which the temperature detection unit detects the temperature of the pressure chamber.

Further, according to the liquid ejection apparatus, the correction unit corrects the drive signal for ejecting a liquid from the ejection module included in the print head based on the N pieces of temperature information (N is a natural number of 2 or more) corresponding to the temperature of the pressure chamber detected by the temperature detection unit at different timings. As a result, even when noise is superimposed on the temperature information corresponding to the temperature of the pressure chamber detected by the temperature detection unit, the influence of the noise is reduced, and as a result, the correction accuracy of the drive signal corrected according to the temperature of the pressure chamber is improved. Therefore, the ejection accuracy of the ink ejected from the ejection module based on the corrected drive signal is improved.

What is claimed is:

1. A print head comprising:

an ejection module that ejects a liquid by receiving a corrected drive signal; and a temperature information output circuit that outputs a temperature information signal indicating a temperature of the ejection module, the ejection module including a piezoelectric element including a first electrode, a second electrode, and a piezoelectric body, the piezoelectric body being located between the first electrode and the second electrode in a stacked direction in which the first electrode, the second electrode, and the piezoelectric body are stacked, the piezoelectric element being driven by receiving the corrected drive signal, a vibration plate located on one side of the piezoelectric element in the stacked direction and deformed by driving the piezoelectric element, a pressure chamber substrate located on one side of the vibration plate in the stacked direction and provided with a pressure chamber whose volume changes due to deformation of the vibration plate, a nozzle that ejects the liquid according to a change in volume of the pressure chamber, and a temperature detection unit that is located on the other side of the vibration plate in the stacked direction and detects a temperature of the pressure chamber, wherein in response to an ejection cycle defining signal, which defines an ejection cycle of the liquid from the ejection module, being input to the temperature information output circuit, the temperature detection unit commences detecting the temperature of the pressure chamber and detecting the temperature of the pressure chamber at different timings until a next ejection cycle defining signal, which defines the ejection cycle and is next to the ejection cycle defining signal, is input to the temperature information output circuit, the temperature information output circuit outputs the temperature information signal corresponding N pieces of temperature information, where N is a natural number of 2 or more, corresponding to the temperature of the pressure chamber detected by the temperature detection unit at the different timings during the ejection cycle from the ejection cycle defining signal to the next ejection cycle defining signal, and the corrected drive signal is a drive signal corrected based on the temperature information signal.

2. The print head according to claim 1, wherein the temperature information output circuit calculates an arithmetic mean of the N pieces of temperature information to output the arithmetic mean as the temperature information signal.

3. The print head according to claim 1, wherein the temperature information output circuit calculates an adjusted average of the N pieces of temperature information to output the adjusted average as the temperature information signal.

4. The print head according to claim 3, wherein when a difference between, among the N pieces of temperature information, i-th temperature information in which a temperature of the pressure chamber is i-th highest, where i is any natural number from 1 to N/2, and (N+1−i)-th temperature information in which a temperature of the pressure chamber is (N+1−i)-th highest is larger than a predetermined threshold value, and a difference between, among the N pieces of temperature information, (i+1)-th temperature information in which a temperature of the pressure chamber is (i+1)-th highest and (N−i)-th temperature information in which a temperature of the pressure chamber is (N−i)-th highest is equal to or less than the predetermined threshold value, the temperature information output circuit calculates an arithmetic mean of N−2×i pieces of temperature information in which, among the N pieces of temperature information, a temperature of the pressure chamber is lower than the i-th temperature information, and a temperature of the pressure chamber is higher than the (N+1-i)-th temperature information to output the arithmetic mean as the temperature information signal.

5. The print head according to claim 1, wherein the different timings are included in a period during which the ejection module receives the corrected drive signal and ejects a liquid.

6. A liquid ejection apparatus comprising:

a drive signal output circuit that outputs a corrected drive signal;

a correction unit that corrects the drive signal; and a print head that receives the corrected drive signal and ejects a liquid, wherein the print head includes an ejection module that receives the corrected drive signal and ejects a liquid, and a temperature information output circuit that outputs, to the correction unit, a temperature information signal indicating a temperature of the ejection module, wherein the ejection module includes a piezoelectric element including a first electrode, a second electrode, and a piezoelectric body, the piezoelectric body being located between the first electrode and the second electrode in a stacked direction in which the first electrode, the second electrode, and the piezoelectric body are stacked, the piezoelectric element being driven by receiving the corrected drive signal, a vibration plate located on one side of the piezoelectric element in the stacked direction and deformed by driving the piezoelectric element, a pressure chamber substrate located on one side of the vibration plate in the stacked direction and provided with a pressure chamber whose volume changes due to deformation of the vibration plate, a nozzle that ejects the liquid according to a change in volume of the pressure chamber, and a temperature detection unit that is located on the other side of the vibration plate in the stacked direction and detects a temperature of the pressure chamber, and wherein in response to an ejection cycle defining signal, which defines an ejection cycle of the liquid from the ejection module, being input to the temperature information output circuit, the temperature detection unit commences detecting the temperature of the pressure chamber and detecting the temperature of the pressure chamber at different timings until a next ejection cycle defining signal, which defines the ejection cycle and is next to the ejection cycle defining signal, is input to the temperature information output circuit, the temperature information output circuit outputs the temperature information signal corresponding N pieces of temperature information, where N is a natural number of 2 or more, corresponding to the temperature of the pressure chamber detected by the temperature detection unit at the different timings during the ejection cycle from the ejection cycle defining signal to the next ejection cycle defining signal, and the correction unit corrects the drive signal based on the temperature information signal.

* * * * *